(12) United States Patent
Rangasamy et al.

(10) Patent No.: US 10,904,173 B2
(45) Date of Patent: Jan. 26, 2021

(54) NEAR REAL-TIME MESSAGING SERVICE FOR DATA CENTER INFRASTRUCTURE MONITORING DATA

(71) Applicant: Equinix, Inc., Redwood City, CA (US)

(72) Inventors: Venkatachalam Rangasamy, Fremont, CA (US); Jaganathan Jeyapaul, Saratoga, CA (US); Vijaay Doraiswamy, Fremont, CA (US); Brian J. Lillie, Los Altos, CA (US); Ashwin Kamath, Sunnyvale, CA (US); Srinivasa Rao Yedluri, San Jose, CA (US); Purvish Purohit, Sunnyvale, CA (US); Divesh Kumar, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 16/004,052

(22) Filed: Jun. 8, 2018

(65) Prior Publication Data
US 2018/0359201 A1   Dec. 13, 2018

Related U.S. Application Data

(60) Provisional application No. 62/573,034, filed on Oct. 16, 2017, provisional application No. 62/517,464, filed on Jun. 9, 2017.

(51) Int. Cl.
*H04L 12/24* (2006.01)
*H04L 12/58* (2006.01)
(Continued)

(52) U.S. Cl.
CPC .............. *H04L 51/046* (2013.01); *G06F 9/46* (2013.01); *G06F 11/30* (2013.01);
(Continued)

(58) Field of Classification Search
None
See application file for complete search history.

(56) References Cited

U.S. PATENT DOCUMENTS

| | | |
|---|---|---|
| 6,456,306 B1 | 9/2002 | Chin et al. |
| 6,973,491 B1 | 12/2005 | Staveley et al. |

(Continued)

FOREIGN PATENT DOCUMENTS

| | | |
|---|---|---|
| EP | 1411456 A2 | 4/2004 |
| WO | 0133356 A1 | 5/2001 |
| WO | 2017123674 A1 | 7/2017 |

OTHER PUBLICATIONS

"Wherever You Are Access Your Data," OSIsoft, osisoft.com, 2015, 4 pp. (Applicant points out, in accordance with MPEP 609.04(a), that the year of publication, 2015, is sufficiently earlier than the effective U.S. filing date, 2018, so that the particular month of publication is not in issue.).

(Continued)

*Primary Examiner* — Cai Y Chen
(74) *Attorney, Agent, or Firm* — Shumaker & Sieffert, P.A.

(57) ABSTRACT

In some examples, a method includes receiving, by a data center infrastructure monitoring system, a registration request that indicates a method of a subscription application programming interface and specifies one or more event subjects of events describing a system operation of a data center; storing, by the data center infrastructure monitoring system to a data-topic map, respective mappings for the one or more event subjects to a topic of a cloud-based publication platform; monitoring, by a data center infrastructure monitoring system, a plurality of physical infrastructure assets that enable system operation within the data center to obtain an event that describes one of the event subjects; and (Continued)

publishing, by the data center infrastructure monitoring system, the event to the topic.

17 Claims, 20 Drawing Sheets

(51) Int. Cl.
G06F 9/46 (2006.01)
G06F 11/30 (2006.01)
H04L 12/28 (2006.01)
H04L 12/26 (2006.01)
H04L 29/08 (2006.01)

(52) U.S. Cl.
CPC ...... *H04L 12/2823* (2013.01); *H04L 41/0681* (2013.01); *H04L 43/08* (2013.01); *H04L 67/10* (2013.01); *H04L 67/32* (2013.01); *H04L 41/0213* (2013.01)

(56) References Cited

U.S. PATENT DOCUMENTS

| | | | |
|---|---|---|---|
| 7,310,664 | B1 | 12/2007 | Merchant et al. |
| 7,496,888 | B2 | 2/2009 | Sanjar et al. |
| 7,774,446 | B2 | 8/2010 | Nedelcu et al. |
| 8,639,482 | B2 | 1/2014 | Rasmussen et al. |
| 8,737,357 | B2 | 5/2014 | Denny et al. |
| 8,738,753 | B2 | 5/2014 | Devraj et al. |
| 8,849,995 | B1 | 9/2014 | Gabrielson et al. |
| 8,990,639 | B1 | 3/2015 | Marr et al. |
| 9,165,120 | B1 | 10/2015 | Brandwine et al. |
| 9,350,703 | B2 | 5/2016 | Murthy et al. |
| 9,426,030 | B1 | 8/2016 | Anerousis et al. |
| 9,519,517 | B2 | 12/2016 | Dalgas et al. |
| 9,571,588 | B2 | 2/2017 | Duffy et al. |
| 9,634,893 | B2 | 4/2017 | Boutros et al. |
| 9,762,438 | B2 | 9/2017 | Anerousis et al. |
| 9,886,267 | B2 | 2/2018 | Maheshwari |
| 9,948,521 | B2 | 4/2018 | Doraiswamy et al. |
| 9,948,552 | B2 | 4/2018 | Teng et al. |
| 2006/0193252 | A1 | 8/2006 | Naseh et al. |
| 2006/0271544 | A1 | 11/2006 | Devarakonda et al. |
| 2009/0138313 | A1 | 5/2009 | Morgan et al. |
| 2009/0144338 | A1 | 6/2009 | Feng et al. |
| 2009/0144393 | A1 | 6/2009 | Kudo |
| 2009/0217162 | A1 | 8/2009 | Schneider |
| 2010/0005331 | A1 | 1/2010 | Somasundaram et al. |
| 2010/0057935 | A1 | 3/2010 | Kawai et al. |
| 2010/0131109 | A1 | 5/2010 | Rasmussen et al. |
| 2010/0211669 | A1 | 8/2010 | Dalgas et al. |
| 2012/0059934 | A1 | 3/2012 | Rafiq et al. |
| 2012/0290135 | A1 | 11/2012 | Bentivegna et al. |
| 2013/0198354 | A1 | 8/2013 | Jones et al. |
| 2013/0232240 | A1 | 9/2013 | Purusothaman |
| 2014/0359131 | A1 | 12/2014 | Seed et al. |
| 2015/0012566 | A1 | 1/2015 | Cartwright et al. |
| 2015/0051749 | A1 | 2/2015 | Hancock et al. |
| 2015/0156079 | A1 | 6/2015 | Satterlee et al. |
| 2015/0180544 | A1 | 6/2015 | Morimoto et al. |
| 2015/0180736 | A1 | 6/2015 | Leung |
| 2015/0207682 | A1 | 7/2015 | Moraes Nichele et al. |
| 2015/0269048 | A1 | 9/2015 | Marr et al. |
| 2015/0312311 | A1 | 10/2015 | Subramanian et al. |
| 2015/0350016 | A1 | 12/2015 | Gundogola et al. |
| 2016/0050116 | A1 | 2/2016 | Sheshadri et al. |
| 2016/0087933 | A1 | 3/2016 | Johnson et al. |
| 2016/0124742 | A1 | 5/2016 | Rangasamy et al. |
| 2016/0127254 | A1 | 5/2016 | Kumar et al. |
| 2016/0127454 | A1 | 5/2016 | Maheshwari et al. |
| 2016/0156711 | A1 | 6/2016 | Purusothaman |
| 2016/0308762 | A1 | 10/2016 | Teng et al. |
| 2016/0352588 | A1 | 12/2016 | Subbarayan et al. |
| 2016/0373293 | A1* | 12/2016 | Kushmerick ........... H04L 67/38 |
| 2017/0012941 | A1 | 1/2017 | Subbarayan et al. |
| 2017/0041248 | A1 | 2/2017 | Toy |
| 2017/0078241 | A1 | 3/2017 | Zhang et al. |
| 2017/0093958 | A1 | 3/2017 | Huang |
| 2017/0200240 | A1 | 7/2017 | Marinelli et al. |
| 2017/0201413 | A1 | 7/2017 | Marinelli et al. |
| 2017/0201424 | A1 | 7/2017 | Doraiswamy et al. |
| 2017/0201425 | A1 | 7/2017 | Marinelli et al. |
| 2017/0201585 | A1 | 7/2017 | Doraiswamy et al. |
| 2017/0272316 | A1* | 9/2017 | Johnson ................ H04L 61/301 |
| 2018/0359201 | A1 | 12/2018 | Rangasamy et al. |

OTHER PUBLICATIONS

U.S. Appl. No. 62/573,034, by Rangasamy et al., filed Oct. 16, 2017.
International Search Report and Written Opinion of International Application No. PCT/US2018/036729, dated Aug. 22, 2018, 15 pp.
Rangasamy, "Data Center Infrastructure Management (DCIM) is in the Top 10 Disruptive Technologies," blog. equinix.com, Jan. 24, 2018, 3 pp.
Rangasamy, "Equinix is Rolling Out IBX SmartView APIs," blog. equinix.com, Jul. 27, 2017, 7 pp.
"Learn How to Use the APIs to Create a New App or Enhance Existing Apps," equinix.com, Jun. 10, 2017, 2 pp.
"What is Google Cloud Pub/Sub?," cloud.google.com, Apr. 10, 2017, 7 pp.
Non-final Office Action issued in U.S. Appl. No. 16/161,445 dated Nov. 13, 2019, 24 pp.
International Preliminary Report on Patentability issued in International Application No. PCT/US2018/036729, dated Dec. 19, 2019, 8 pp.
Response to Non-Final Office Action filed in U.S. Appl. No.16/161,445 dated Feb. 13, 2020, 14 pp.
Final Office Action issued in U.S. Appl. No. 16/161,445 dated Mar. 30, 2020, 27 pp.
"Data Center Infrastructure," Techopedia, www.techopedia.com, https://www.techopedia.com/definition/29711/data-center-infrastructure, May 4, 2017, 1 p.
Amendment in Response to Office Action dated Mar. 30, 2020, from U.S. Appl. No. 16/161,445, filed May 29, 2020, 11 pp.
Notice of Allowance dated Jul. 6, 2020, from U.S. Appl. No. 16/161,445, 13 pp.
First Examination Report from counterpart Australian Patent Application No. 2018280266, dated Jun. 29, 2020, 3 pp.
Response to Communication Pursuant to Rules 161(1) and 162 EPC dated Jan. 21, 2020, from counterpart European Application No. 18738041.5, filed Jul. 31, 2020, 80 pp.
Response to First Examination Report dated Jun. 29, 2020, from counterpart Australian Patent Application No. 2018280266, filed Aug. 11, 2020, 6 pp.

\* cited by examiner

NEAR REAL-TIME MESSAGING SERVICE FOR DATA CENTER INFRASTRUCTURE MONITORING DATA This application claims the benefit of U.S. Provisional Application 62/517,464, filed Jun. 9, 2017; and of U.S. Provisional Application 62/573,034, filed Oct. 16, 2017; each which is incorporated by reference herein in its entirety.

TECHNICAL FIELD

The disclosure relates to data centers and, more specifically, to monitoring data center infrastructure.

BACKGROUND

A network services exchange provider or co-location provider (a "provider") may deploy a data center in which multiple customers of the provider locate network, server, and storage gear and interconnect to a variety of telecommunications and other network service provider(s) with a minimum of cost and complexity. Data centers may be shared by multiple tenants locating networking, computing, and storage equipment within the data centers.

A data center may include a storage volume storing numerous electronic devices that produce heat, including network, server, and storage gear, as well as power distribution units for distributing power to devices within the facility, for example. The data center may also include cooling units to supply a cool air stream into the storage volume.

SUMMARY

In general, techniques are described for a near real-time messaging service that provides access to data center event data, including machine data feeds, via dynamically configurable subscription topics. For example, a network services exchange provider or co-location provider ("provider") may deploy a data center and a data center monitoring system that produces event data, including machine data, associated with data center infrastructure assets. The event data may include, for example, alarm data; alert data; tagpoints describing properties of infrastructure assets such as HVAC (heating ventilation and air conditioning) units, computer room air conditioning units, power supplies, generators, power distribution units, and switchgears; power consumption data points; and environmental sensor data points.

A computing system executes a messaging service that applies real-time processing to the events and publishes the processed events to custom topics of a publication platform to enable application programming interface (API) consumers to receive event data in near real-time. For example, API consumers may register for custom topics using an API that receives registration requests for access to events. The messaging service processes each registration request to authorize the requesting consumer, creates a custom topic for the requesting customer, and returns a description of custom topic to the customer for accessing the event data. In addition, the messaging service generates or modifies, in a data structure, respective entries for requested events that map the subjects of events to the relevant topics used for publishing the event data. To make the event data accessible, the messaging service uses the entries of the data structure to map new data from the events to the one or more relevant topics and publish the new event data to the identified, relevant topics. In this way, the data center infrastructure monitoring and messaging service described herein may enable customers, developers, Internet of Things (IoT) or other devices, and management systems to consume, in near real-time, event data including machine data feeds generated by one or more data center monitoring systems for globally distributed data centers having a large scale of infrastructure components that may be located in multiple regions and metropolitan areas. Such techniques may enable integration with customer dashboards and provide near real-time actionable information to API consumer and data center operators.

In some examples, a method includes receiving, by a data center infrastructure monitoring system, a registration request that indicates a method of a subscription application programming interface and specifies one or more event subjects of events describing a system operation of a data center; storing, by the data center infrastructure monitoring system to a data-topic map, respective mappings for the one or more event subjects to a topic of a cloud-based publication platform; monitoring, by a data center infrastructure monitoring system, a plurality of physical infrastructure assets that enable system operation within the data center to obtain an event that describes one of the event subjects; and publishing, by the data center infrastructure monitoring system, the event to the topic.

In some examples, a computer-readable storage medium comprising instructions that when executed cause one or more processors of a data center infrastructure monitoring system to receive a registration request that indicates a method of a subscription application programming interface and specifies one or more event subjects of events describing a system operation of a data center; store, to a data-topic map, respective mappings for the one or more event subjects to a topic of a cloud-based publication platform; monitor a plurality of physical infrastructure assets that enable system operation within the data center to obtain an event that describes one of the event subjects; and publish the event to the topic.

In some examples, a computing system includes one or more processors and memory, the one or more processors and memory configured for: receiving a registration request that indicates a method of a subscription application programming interface and specifies one or more event subjects of events describing a system operation of a data center; storing, to a data-topic map, respective mappings for the one or more event subjects to a topic of a cloud-based publication platform; monitoring a plurality of physical infrastructure assets that enable system operation within the data center to obtain an event that describes one of the event subjects; and publishing the event to the topic.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
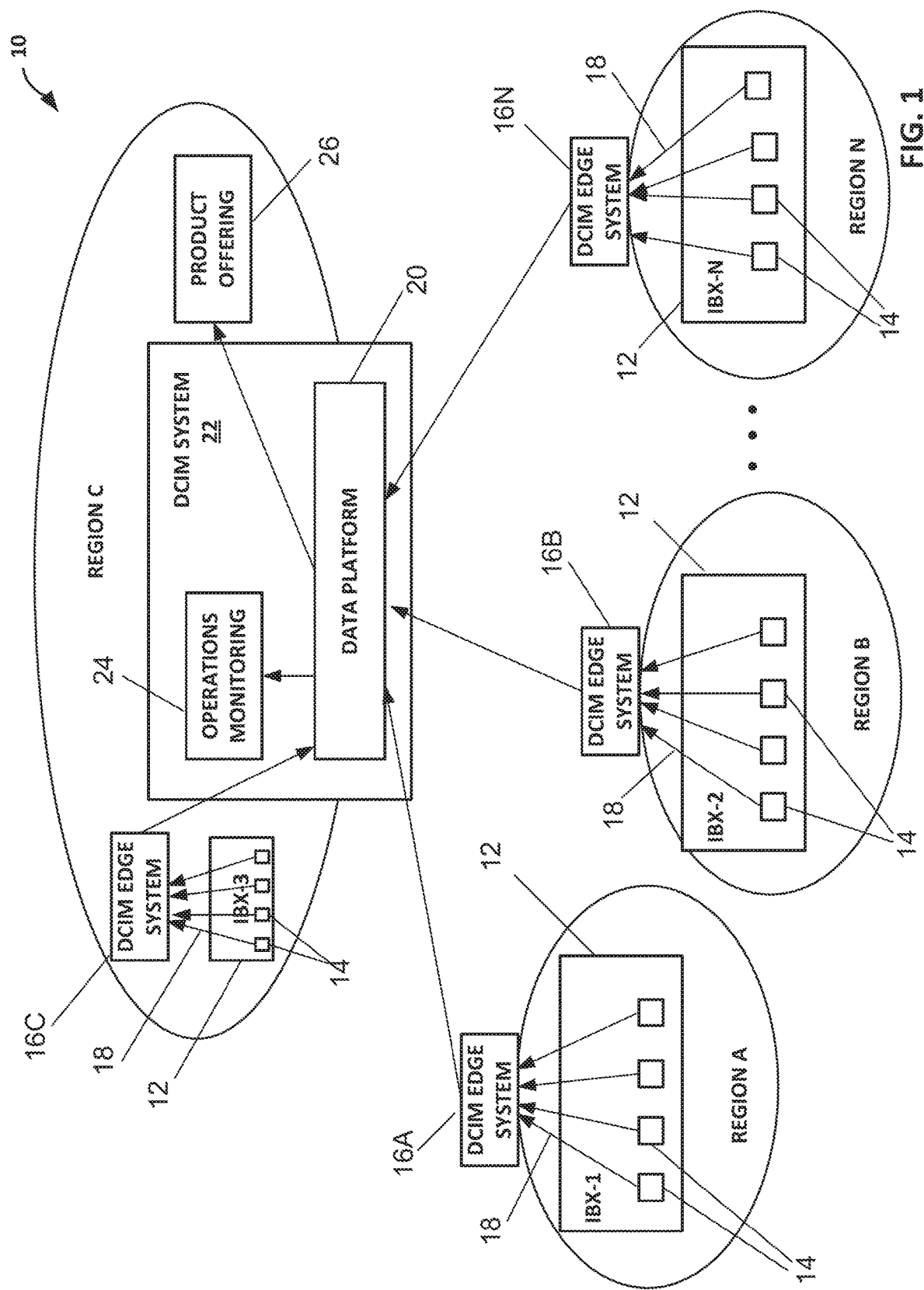
FIG. 1 is a block diagram illustrating an example system for data center infrastructure monitoring, in accordance with techniques described herein.

FIG. 1 is a block diagram illustrating an example system 10 for a data center infrastructure monitoring system, in accordance with techniques described herein. In the example of FIG. 1, system 10 includes multiple data centers 12 (also referred to herein as "co-location facilities" or "international business exchanges (IBX1-IBX-N)"), with each of the data centers 12 being located at one or more geographically distributed locations. For example, the data center infrastructure monitoring system 10 may include multiple data centers 12 located within a single region (e.g., country, continent) of regions A-N, or may include multiple data centers 12 located within multiple regions A-N.

Each of the multiple data centers 12 located within a given region A-N include multiple physical infrastructure assets 14 that enable operation of a physical building and IT systems located within the data center 12. For example, the assets 14 may include physical structure related to power systems and cooling systems associated with controlling the environment within the data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, assets 14 may include devices related to security, lighting, electrical, structural integrity, occupancy, or energy credits, for example. Each of the assets 14 are communicatively coupled to a corresponding one of data center infrastructure monitoring (DCIM) edge systems 16A-16N ("DCIM edge systems 16") via a connection 18. For example, each of the data centers 12 may communicate data associated with the assets 14 with the corresponding DCIM edge system 16 via one or more of a metro Ethernet network, the Internet, a mobile backhaul network, or a Multiprotocol Label Switching (MPLS) access network (not shown).

As shown in FIG. 1, respective DCIM edge systems 16 are located on different geographically distributed regions A-N. In some examples, a given region may have multiple DCIM edge systems 16 for multiple data centers 12 on the region, such as in different metropolitan areas, or multiple data centers in a metropolitan area. DCIM edge systems 16 may each be located within geographically distributed colocation facility provider facilities (not shown and hereinafter, "colocation facilities"), e.g., colocation data centers, each associated with (e.g., owned and/or operated by) a single colocation facility provider. The colocation service provider is a single entity, business, operator, service provider, or the like. In some examples, the colocation service provider operates an internet exchange, Ethernet exchange, and/or a cloud exchange, such as described in U.S. application Ser. No. 15/099,407, entitled CLOUD-BASED SERVICES EXCHANGE, filed Apr. 14, 2016, the entire contents of which are incorporated by reference herein.

The distributed colocation facilities in which the DCIM edge systems 16 are located may be connected by Wide Area Network (WAN). In this way, each of the DCIM edge systems 16 are connected to a data platform 20 within an operations/monitoring center 22 located within one of regions A-N, including being located within one of regions A-N having one or more data centers 12 co-located therein. Data associated with assets 14 from multiple data centers 12 is therefore received by the operation/monitoring center of a central DCIM system 22, and the data is then stored in a central platform for subsequent analysis and distribution by an operations monitoring infrastructure 24. In some examples, the data may be offered as part of a product offering 26, and/or utilized by one or more of the data centers 12 to monitor and control infrastructure and optimize ongoing operation of the one or more data centers 12, as described below in detail.

In some examples, DCIM edge systems 16 and DCIM system 22 may include components that function well offline without using a network to back them up, such as by using local storage for buffering messages that need to go across the network. In some examples, DCIM edge systems 16 and DCIM system 22 may employ a data platform to support real time data streaming, data-in-transit to data-at-rest, which is reliable and robust to prevent data loss. In some examples, DCIM edge systems 16 and DCIM system 22 may include granular independent components designed to do one thing well.

DCIM system 22 may use a set of collaborating services (e.g., micro-services) organized around business capabilities. In some examples, DCIM edge systems 16 use infrastructure modeling (e.g., JSON-based) to standardize across machines and devices. DCIM edge systems 16 and DCIM system 22 may distribute and parallelize the processing of data from assets 14 across machines over the network.

Security features may be built in to system 10. For example, in some examples DCIM edge systems 16 and DCIM system 22 may include end-to-end trust points and countermeasures for each component in the ecosystem of system 10. In some examples, system 10 defines API contracts first using Domain Driven Design and exposes everything as a respective service. In some examples, DCIM edge systems 16 and DCIM system 22 may rely on container-based cloud native application development. In some examples, DCIM edge systems 16 and DCIM system 22 may use lightweight and platform-agnostic communication between the components and with each other using smart end points and light weight protocols. System 10 provides automation and continuous delivery and deployment to enable developers for seamless deployment and maintenance of assets 14 in system 10. Additional example description of a DCIM system is found in U.S. patent application Ser. No. 15/404,015, filed Nov. 11, 2017, and entitled, "Architecture for Data Center Infrastructure Monitoring," the entire contents of which is incorporated by reference herein.

Figure 2:
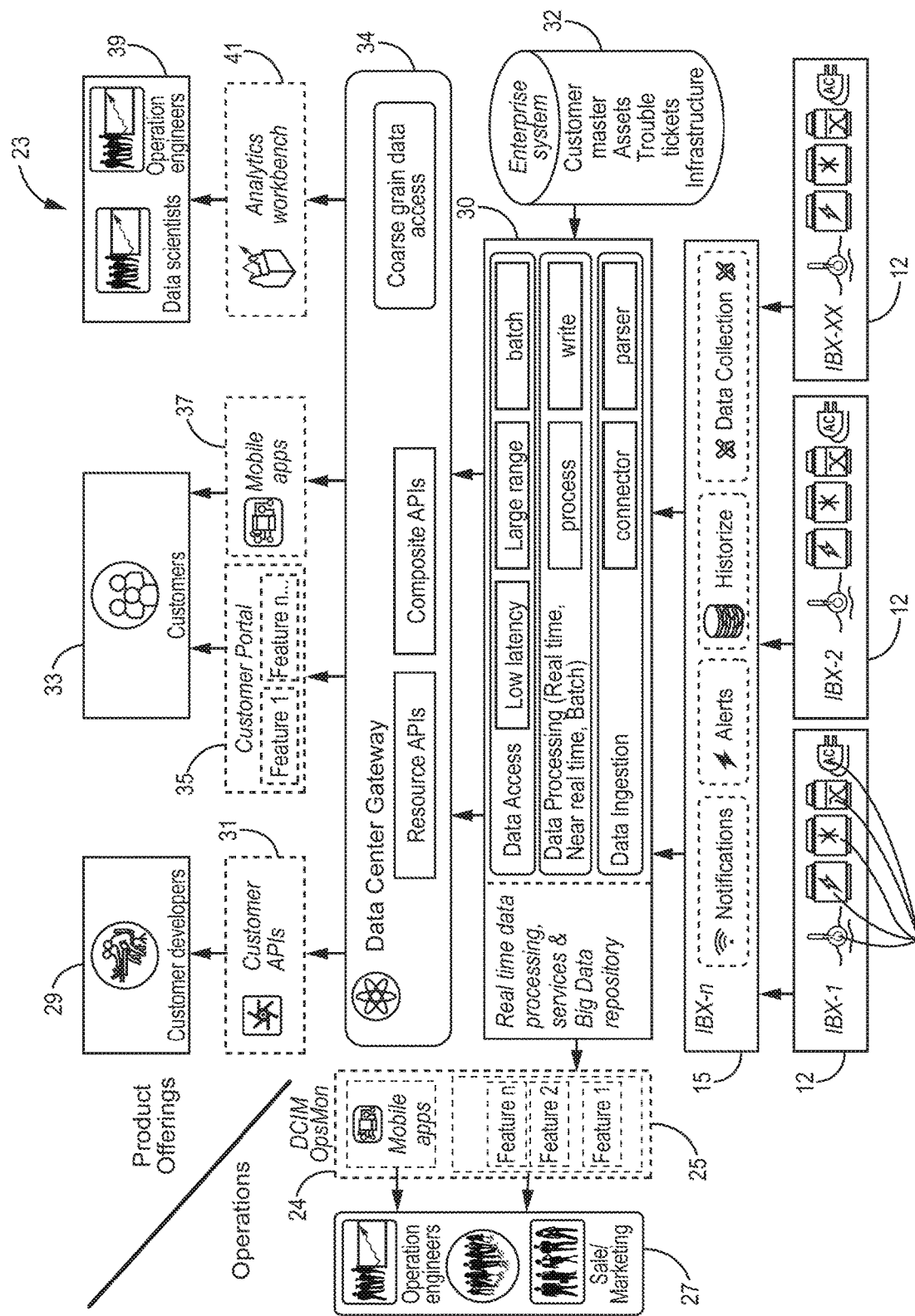
FIG. 2 is a block diagram illustrating an example data center infrastructure monitoring system, in accordance with techniques described herein.

FIG. 2 is a block diagram illustrating example reference architecture for a data center infrastructure monitoring system 23, in accordance with techniques described herein. The DCIM system 23 of FIG. 2 may correspond to DCIM system 22 and DCIM edge systems 16 of FIG. 1, for example. In the example of FIG. 2, the assets 14 included in the data centers 12 may include such data center infrastructure assets as temperature centers, power units, chillers, power usage and power switching, for example. The global DCIM system 10 includes a DCIM system 22 that gathers information related to the layer of assets 14 from multiple data centers 12, and stores the information within a data repository 30. The global information in data repository 30 is used to gather and create analytics for customers, business development and operations, using real time end to end data collection, operational analytics, predictive analytics, data processing and services. In some examples, data monetization and what-if analysis utilizing data science algorithms may be performed using the global information. An enterprise system 32 is included to enable data centers 12 to notify DCIM system 22 when specific assets are non-operational, i.e., "offline", or experiencing operational disturbances. Enterprise system 32 may store data relating to one or more of customer master assets, trouble tickets, and infrastructure, for example.

A data center gateway 34 integrates with customer portal 35 and customer application programming interfaces (APIs) 31 to enable role based access control for users of cross-functional nature, such as operations, sales and customer roles, along with access governance and perimeter access controls for each system. Data center gateway 34 may provide resource APIs, composite APIs, and/or coarse grain data access, for example. The global information is used by the DCIM operations monitoring infrastructure 24 to develop certain features and mobile applications used by operation engineers and sales and marketing, including micro-services architecture driven feature based development of applications. The DCIM system 22 may provide authorization, access controls, audit trails, notification services, system health checks and integration.

In this way, information 15, such as notifications, alerts, and history associated with particular asset events, along with general asset data is received from multiple data centers 12 (IBX1-IBXX) and is collected within data repository 30. Data repository 30 processes the data in real-time, near real time and/or in batches. The resulting processed multi-data center asset data is received by DCIM operations monitoring infrastructure 24, which transfers specific features 25 associated with the assets for internal operations 27 (e.g., internal to the co-location facility provider that operates data centers 12), including sales and marketing personnel and operations engineers, for example. In some examples, DCIM operations monitoring infrastructure 24 presents the data via mobile applications. In addition, the resulting asset data is received by customer developers 29 via customer APIs 31, and/or by specific customers 33 via customer portals 35 or mobile applications 37. The resulting data (e.g., coarse grain data) may also be accessed by data scientists and operations engineers 39 via an analytics workbench 41.

Figure 3:
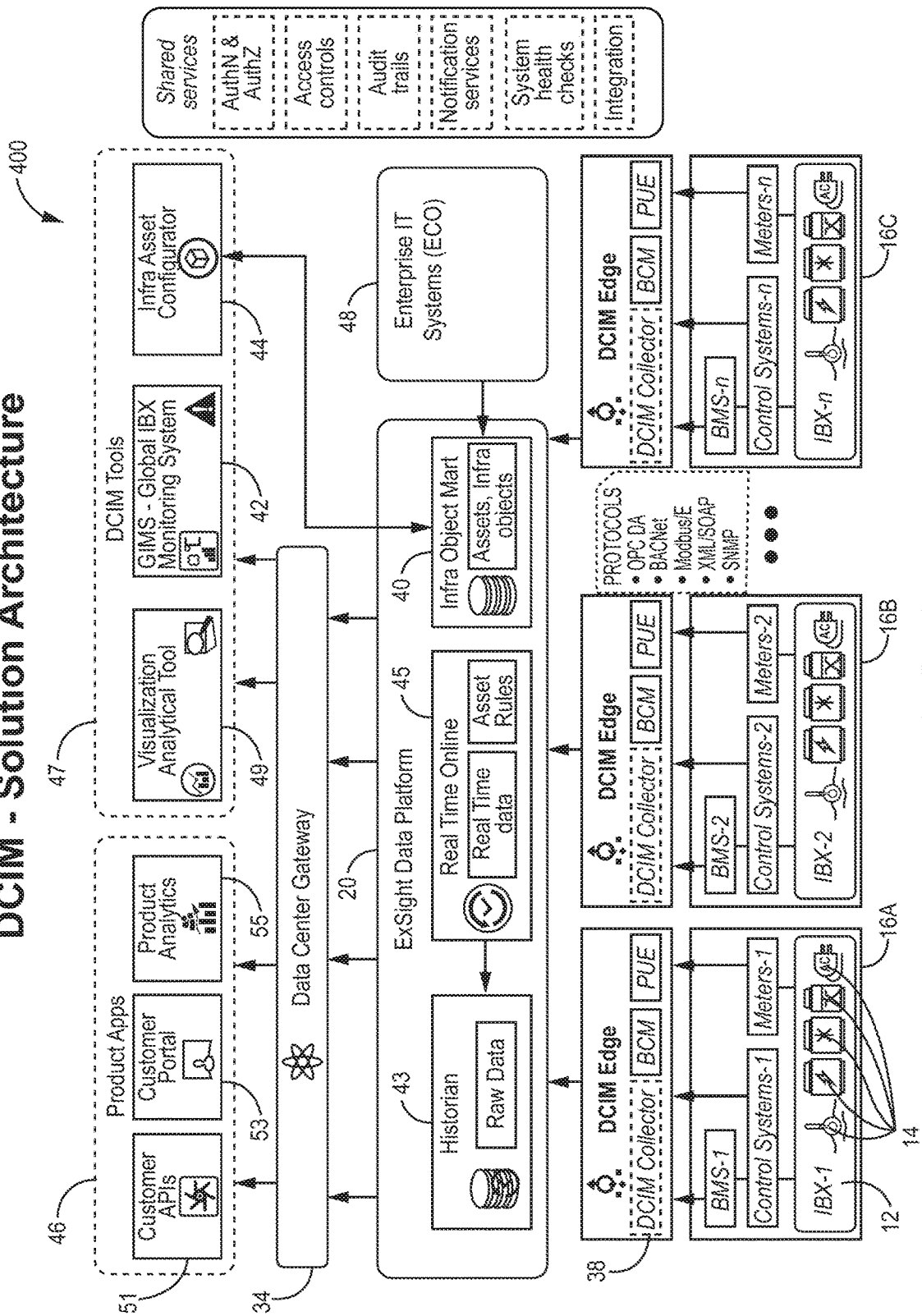
FIG. 3 is block diagram illustrating an example data center infrastructure monitoring system, in accordance with techniques described herein.

FIG. 3 is block diagram illustrating an example data center infrastructure monitoring system 400 architecture, in accordance with techniques described herein. The DCIM system 400 of FIG. 3 may correspond to DCIM system 22 and DCIM edge systems 16 of FIG. 1, and DCIM system 23 of FIG. 2, for example. In some examples, DCIM edge systems 16 receive data generated by assets 14 via one or more meters, control systems, and/or BMSs. In some examples, assets 14 may be "smart" devices, i.e., physical objects that contain embedded technology configured to provide some degree of computing intelligence. These smart devices may communicate and sense or interact with their internal states or the external environment.

In the example of FIG. 3, the DCIM edge systems 16 may include a DCIM collector 38 for collecting asset tag points and data interfacing, along with branch circuit monitoring (BCM) and power usage effectiveness (PUE) monitoring. In some examples, DCIM collectors 38 may each include interfaces for various protocols by which DCIM collectors 38 receive data from BMS, control systems, and meters, such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example.

Data platform 20 includes an infrastructure object mart 40 that is a data store for storing asset models and infra objects, described below, that receives asset data from multiple data centers 12 via associated DCIM edge systems 16 and drives processing of how data comes into the DCIM system 22, how the data is processed once within the DCIM system 22, and how the data is presented by the DCIM system 22 via a user interface or visualization tools. In this way, the DCIM system 22 performs common infra asset modeling for various assets 14 in the data centers 12, including alerts and notification configuration for tag points. DCIM system 22 includes data lifecycle management for real time online data storage, a data historian storing data history, real time alerts and notifications, and integration with a source system of record of the co-location facility provider that operates data centers 12. Data platform also includes a historian 43 for storing raw data, and a real time online data store 45 for storing real time data and asset rules. An enterprise IT system 48 interacts with the data platform 20 and may be utilized to make the data meaningful.

DCIM system 22 includes DCIM tools 47, such as a global data center (IBX) monitoring system (GIMS) 42 for data center health monitoring, reporting and dashboards, and infrastructure asset usage analysis, and a visualization analytical tool 49 for presenting and reviewing asset data information. In addition, DCIM tools 47 may include an infrastructure asset configurator 44 ("infra asset configurator") that transfers information to and receives data information from infrastructure object mart 40 and performs common infrastructure asset modeling for various devices in the data centers 12, along with alerts and notification configurations for tag points. Asset data is transmitted from data platform 20 to DCIM tools 47 via data center gateway 34. Product applications 46 in DCIM system 22 include application programming interfaces such as customer APIs 51 and customer portals 53, along with product analytics 55 for cross selling and upselling of data, which receive data from the data platform 20 via data center gateway 34.

Figure 4:
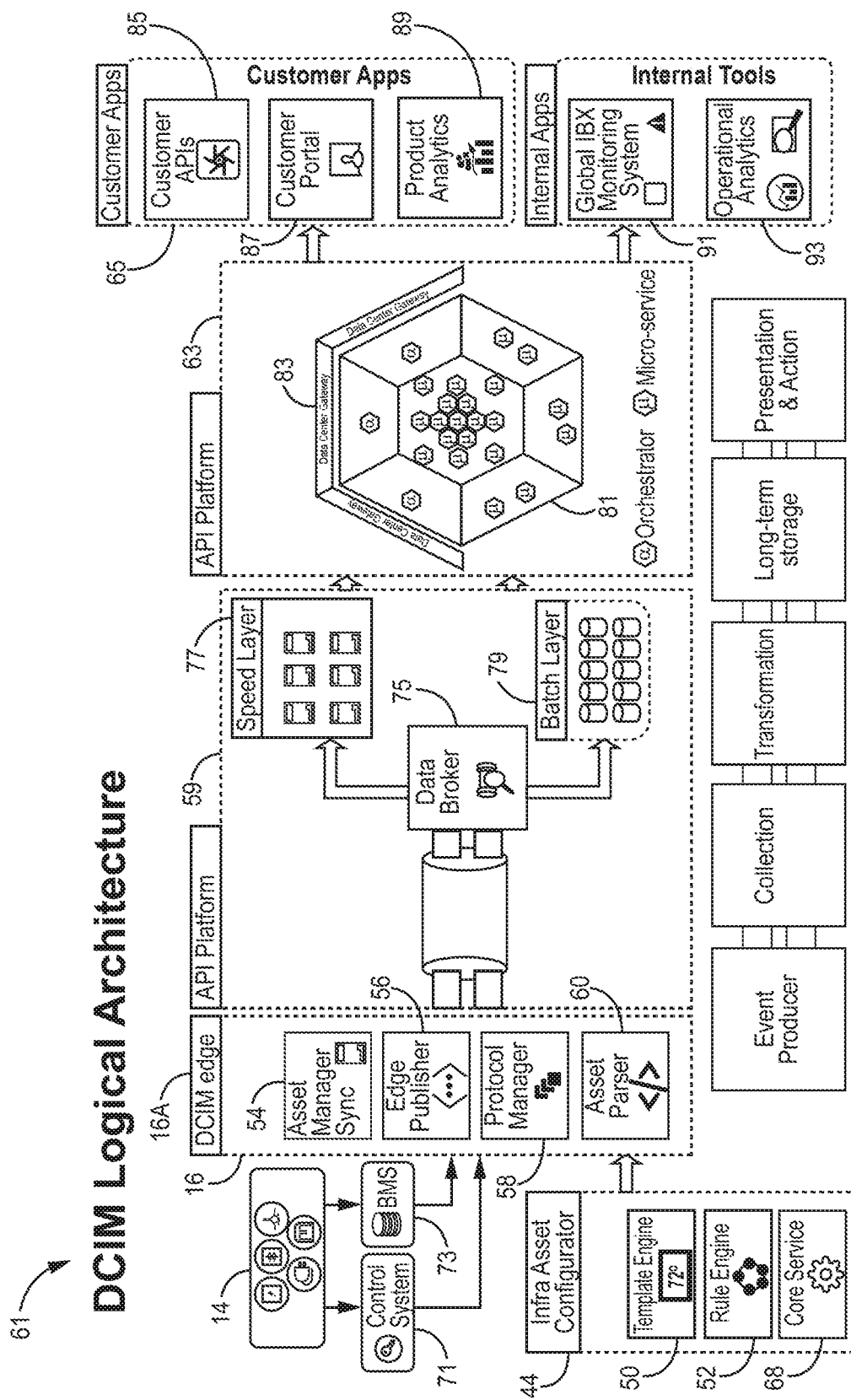
FIG. 4 is a block diagram illustrating a logical architecture in an example data center infrastructure monitoring system, in accordance with techniques described herein.

FIG. 4 is a block diagram illustrating an example logical architecture 61 of a data center infrastructure monitoring system, in accordance with techniques described herein. DCIM logical architecture 61 of FIG. 4 may correspond to DCIM system 22 and DCIM edge systems 16 of FIG. 1, for example. The DCIM logical architecture 61 may offer such functionality as event producing, collection, transformation, long-term storage, presentation, and action. In the example of FIG. 4, the DCIM logical architecture 61 includes an infra asset configurator 44 used by a DCIM edge system 16A to classify and manage a plurality of assets 14 for which DCIM edge 16 receives information. The DCIM logical architecture also includes a data platform 59 and an API platform 63 for providing data to customer applications 65 and internal applications 67.

In the example of FIG. 4, infra asset configurator 44 includes a template engine 50 for applying a template to data received from data centers 12, as described below, a rules engine 52 associated with the format of the templates, along with core services 68, described below in FIG. 6. Each DCIM edge system 16 includes an asset manager synchronizer 54, an edge publisher 56, a protocol manager 58 and an asset parser 60, for receiving asset data associated with assets 14 of the data center 12 via a control system 71 and a building management system (BMS) 73. Information related to data assets 14 is transferred to an associated DCIM edge 16 via control system 71 and BMS 73. A data broker 75 of data platform 59 receives the data assets via publisher 56 of DCIM edge 16 and processes the data using one or more of speed layer processing 77 and batch layer processing 79 techniques (described in further detail with respect to FIG. 8). API platform 63 (described in further detail with respect to FIGS. 10 and 11) includes an orchestrator 81 and underlying data service (micro-services) 83 for providing API endpoints for transmitting the asset data to customer applications 65, such as customer APIs 85, customer portals 87 and product analytics 89, and internal tools 67, such as global IBX monitoring system 91 and operational analytics 93.

Figure 5:
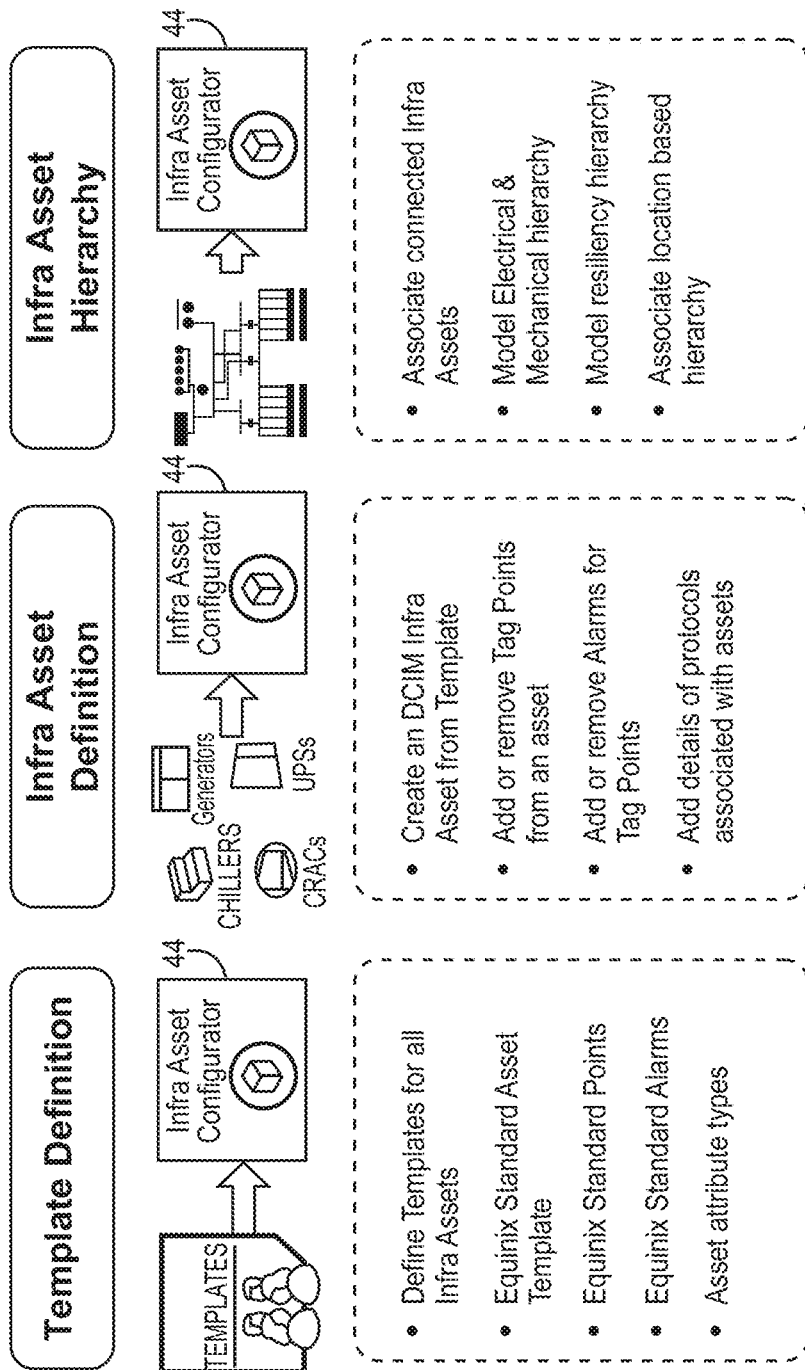
FIG. 5 is a block diagram illustrating an example normalization process of an infrastructure asset configurator in a data center infrastructure monitoring system, in accordance with techniques described herein.

FIG. 5 is a block diagram illustrating an example normalization process of an infrastructure asset configurator (e.g., infra asset configurator 44 of FIGS. 4 and 6) in a data center infrastructure monitoring system, in accordance with techniques described herein. A single data center 12 may typically include many assets 14 (e.g., approximately three hundred assets). Due to the large number of assets 14 that may be associated with each data center 12, challenges may arise in being able to compare and contrast data associated with the multitude of assets 14 across data centers 12. For example, in order to benefit from operational efficiencies, best practices are compared across the assets. The best practices could include, for example, practices related to how the asset was set up, how the asset is being configured, how the asset is being used, what hash points and readings are set up, and other any other relevant measurements and/or units associated with the asset. In accordance with the techniques of this disclosure, the DCIM includes an infrastructure asset configurator 44 that provides an asset normalization process, asset modeling options, and a roll-out approach for asset definition, normalization, and standardization. Infrastructure asset configurator 44 follows a normalization process that may include infrastructure asset configurator 44 defining templates, infrastructure asset configurator 44 defining infra assets (i.e., infrastructure asset data that logically represents physical infrastructure assets), and infrastructure asset configurator 44 associating the infra asset within an infra asset hierarchy.

Infrastructure asset configurator 44 initially sets up an asset model that includes an asset definition of each asset type so that assets can be categorized by being associated to a template. For example, if an asset is a generator, the asset is associated with a generator template. In this way levels of abstraction are provided for asset readings. For example, if there is a power distribution unit from which an output distribution reading may be generated and read, such as output voltage, it would be necessary that the reading generated from one data center at one location be identified in the same way as the output distribution from another data center at a different location, so that if the two are to be compared, they have the same tag name configuration to identify them. In other words, the infrastructure asset configurator provides a normalization process that includes asset configurations for defining asset models, for defining how to populate the asset models and what metadata is required to be able to normalize all of the infrastructure assets and asset points. Asset points are readings that the asset 14 is set up to record. For example, zone-temperature may be an asset point if a temperature sensor is available for an asset 14. In some cases, on average, there may be approximately 100 tag points per asset 14. Tag points are associated with units of measure since the quantity that the tag points are reading is intended to be associated with a unit of measure. The DCIM system may include a recording unit of measure, or quantity, to determine data compression rules.

In one example, the DCIM system 22 obtains the data for populating the templates from operation administrators associated with each data center who input data onto a spreadsheet for which protocol detail for each of the assets is part of the spreadsheet, and is then kept as a control list and is loaded into the data platform 20. The template definition includes the asset type information, and also includes all of the readings or points, and all alarms that have been associated with those points. Infrastructure asset configurator 44 may push the templates to other data centers to complete tags/asset type information using common protocols including the same tag names to enable cross comparison. In this way, infrastructure asset configurator 44 brings all assets to a common level of description for comparison using common protocols. The association is not a single data point association, but rather, infrastructure asset configurator 44 may map multiple points to points indicated in the template. Points that are unique only to a specific asset, such as to a single specific generator for example, may not be mapped by infrastructure asset configurator 44, so that only common points across all of the data centers are included in the template. In this way, when a new asset is generated in the DCIM system, the asset configurator 44 may automatically detect what template should be applied for the new asset based on the tag points included with the new asset, and on the mapping between tag points and the template. Assets may have as many as 60 points, and at a high level examples of the asset classifications may be electrical, mechanical, fire and smoke, along with other such infrastructure classifications, for example.

In this way, in the example of FIG. 5, during the normalization process, the infrastructure asset configurator 44 defines templates for all infrastructure assets during template definition to create standard asset templates, standard points, and standard alarms, along with standard asset attribute types. In some examples, the standards templates may be defined by the co-location facility provider operating data centers 12. During infrastructure asset definition, the infrastructure asset configurator 44 creates a DCIM infrastructure asset from the template, adds or removes tag points from an asset, adds or removes alarms for tag points, and adds details of protocols associated with assets. In some examples, an asset model includes pre-defined alarm definitions, e.g., based on the type of asset. During infrastructure asset hierarchy, the infrastructure asset configurator 44 associates connected infrastructure assets, models electrical and mechanical hierarchy, models resiliency hierarchy, and associates location based hierarchy. As a result of the described normalization process, the DCIM system provides a platform to compare and contrast data associated with assets. By providing the template with a defined set of asset tag points, the DCIM system is able to map tag points at an asset level to tag points of a template. For example, for an asset such as a generator, it may be the case that there are one or more generators from one location that have 15 tag points, for example, and one or more generators at another location that have 10 tag points. The DCIM system identifies a common set of tag points that, although the tag points may have been named differently at the two locations, the tag points are meant to have the same purpose, and maps the identified common tag points back to a standard nomenclature defined within the template itself. The resulting mapping may then be then stored.

Infrastructure asset configurator 44 may be employed to provide consistent infrastructure asset views across data centers, asset hierarchy navigation across tools, fault information dashboard (e.g., showing resiliency state), the ability to associate assets using a location-based hierarchy, system alarm dashboards, and infra asset master for data collection, and infra asset models used for all DCIM applications tools, customer applications, and APIs. One or more formats may be used for data modelling by infrastructure asset configurator 44, such as YANG (Yet Another Next Generation), YAML (Yet Another Markup Language), and JSON (JavaScript Object Notation).

Figure 6:
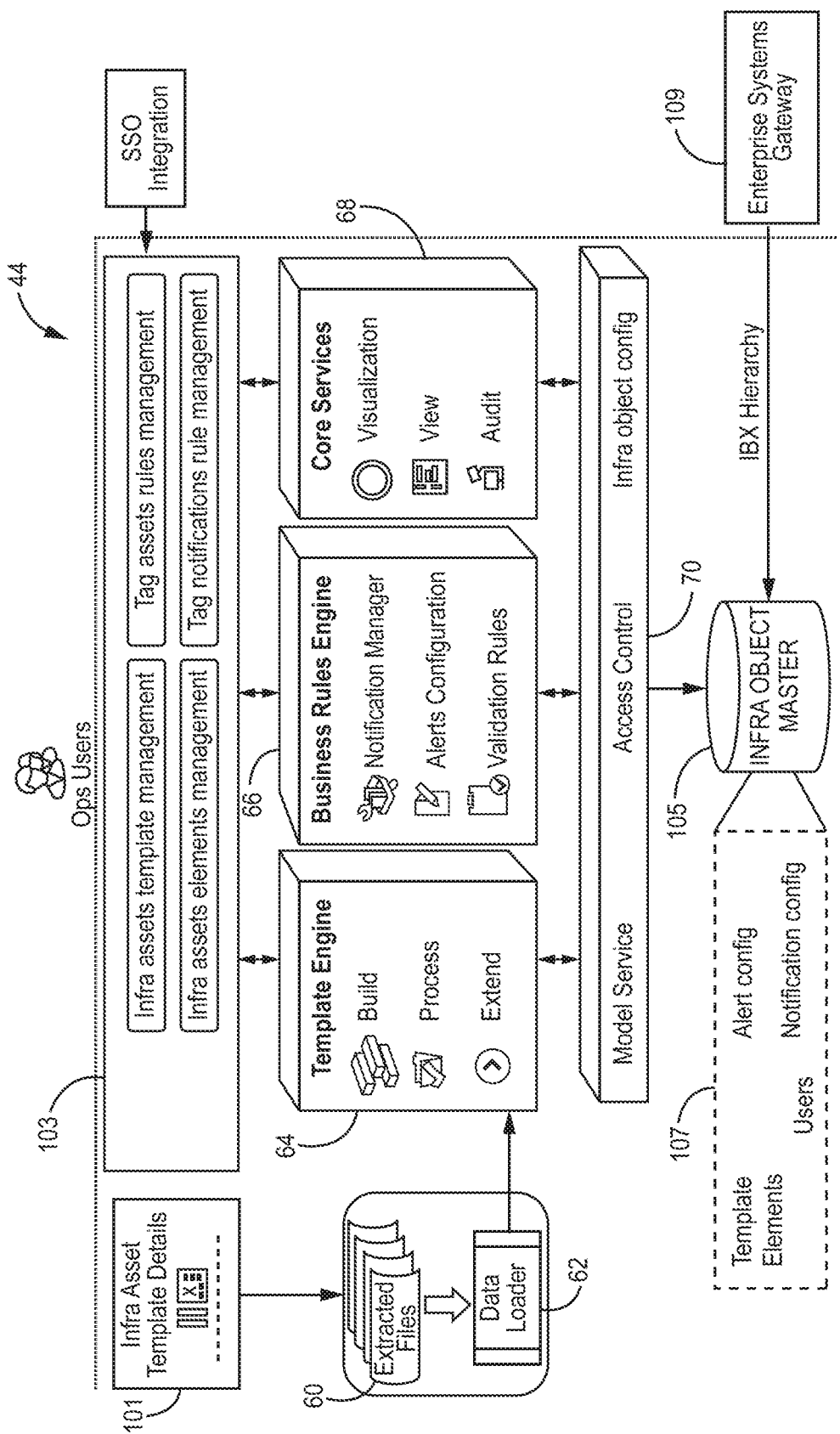
FIG. 6 is a block diagram illustrating in further detail an example infrastructure asset configurator in a data center infrastructure monitoring system, in accordance with techniques described herein.

FIG. 6 is a block diagram illustrating in further detail an example infrastructure asset configurator 44 in a data center infrastructure monitoring system, in accordance with techniques described herein. In the example of FIG. 6, during processing of the asset model, the process begins with data associated with infra asset template details 101 coming in from data sheets and spreadsheets as extracted files 60 that are received and loaded as spreadsheets by a data loader 62. For example, an infrastructure asset instance points template may be formatted as a spreadsheet that includes fields for general attributes, such as an asset instance name, operation, template matched point, display point name, short point name/reference name, point data collection type, data type, recording unit of measurement, decimal places, default state table, whether a data point is customer visible, etc., along with trending information such as COV (%), collection interval (in minutes), and so forth. An infrastructure assets instances spreadsheet may include fields such as operation, infrastructure asset template, asset instance name, customer visible point, location vector (value of the location vector selected in infra. asset template for this instance of the asset), asset ID, asset number, asset site ID, serial number, description, vendor, manufacturer, common attributes, base data collection information such as protocol and scan frequency (in seconds), and so forth.

A template engine 64 includes a building step where, based on the data from the template, the asset model is reconstructed and processed, and some configurations are defined as part of the template as a result of the newly received data. For example, if an oil level is less than a certain threshold, an alarm is generated. Template engine 64 also allows templates to be extended. Business rules engine 66 includes a notification manager for notifying the data centers of changes in configurations that are part of the templates, updates alert configurations, and may include validation rules associated with the template for the asset model using business rules and checks. The business rules engine 66 may allow the data to persist or may send the data back for correction when errors are identified. In some examples, data can be persisted using a database such as a NOSQL database.

In some examples, business rules engine 66 or other component of infra asset configurator 44 may be configured to automatically identify which particular infrastructure assert the infra asset configurator 44 has to go into to detect if a configuration information delta has occurred, or upon identifying a delta determine at which infrastructure asset the delta is and where that infrastructure asset is geographically located.

The infrastructure asset configurator 44 also includes core services 68, such as visualization tools, visualization/views including user interface screens to visually show what information has been provided, along with performing audits to record modifications that occurred and identify who performed the modifications. The infrastructure asset configurator 44 also includes access control 70 for determining who has access to what assets, i.e., external facing customers or internal operations facing guests. For external facing customers, it may be not desirable to allow exposure of all assets or reading to all customers. Rather, exposed data is confined to only those assets that the customer is associated with, and which data center and which cage the specific customer belongs to, so as not to mix information shared by multiple customers. As a result, the access controls are applied on top of the assets indicating who has what access.

In addition, since access is typically upstream, in some examples the DCIM system 22 does not control turning on/off of infrastructure, but rather the assets respond to proprietary controls at the data center by local operations teams. In other examples, the DCIM system 22 may be used by customers or data center operations teams to control or manage infrastructure assets. As one example, customers may use DCIM system 22 to provision infrastructure assets in a self-serviceable manner. As another example, a customer may have smart locks in the customer's cabinets or cages in the data center, and the customer may use the DCIM system 22 to lock or unlock the smart locks. Operations users may interface with asset and tag management module 103, which may support such functionality as infra assets template management, infra assets elements asset, tag asset rules management, and tag notifications rule management. Asset and tag management module 103 enables the data asset information within each data center 12 to be transmitted from template engine 64, business rules engine 66, and core services 68 to operational users for creation, review and processing. Asset and tag management module 103 may have single sign on (SSO) integration, such as with a federation server that provides identity management and single sign-on via a web interface.

In addition, an infra object master 105 stores data such as templates, elements, alert configuration, notification configuration 107, and may receive data center hierarchy information from an enterprise systems gateway 109. Infra object master 105 receives data from the layer of infra asset configurator that supports model service, access control, and infra object configuration.

The infrastructure asset configurator 44 uses templates for multiple infrastructure assets, such as generators, chillers, HVAC, etc., that are used to generate an infra asset master for DCIM and sources data from various source system records (namely IBX Master). In addition, a user interface is included in infrastructure asset configurator 44 that is used by global operations engineering to manage asset normalization. The infrastructure asset configurator 44 includes single sign on and uses APIs for create, read, update and delete (CRUD) operations on asset master data.

In some examples, infra asset configurator 44 may rely on manual uploads of asset information, and not user interface-based configuration. Asset normalization is performed for manually uploaded asset information using a data attributes (points) library and an infrastructure object template library, for example, while data center (IBX) onboarding includes template instantiation, infra object hierarchy management, scan frequency set-up and data collection enablement.

In some examples, infra asset configurator 44 may be automated using a user interface enabling a core services and business rule engine to be built, along with generation of standard device name, standard point name, device definition, device hierarchy management and device templatization.

In some examples, an infra asset configurator 44 may be rolled out in a phased manner, using manual uploads in a first phase and automated UI-based in a second phase.

Figure 7A:
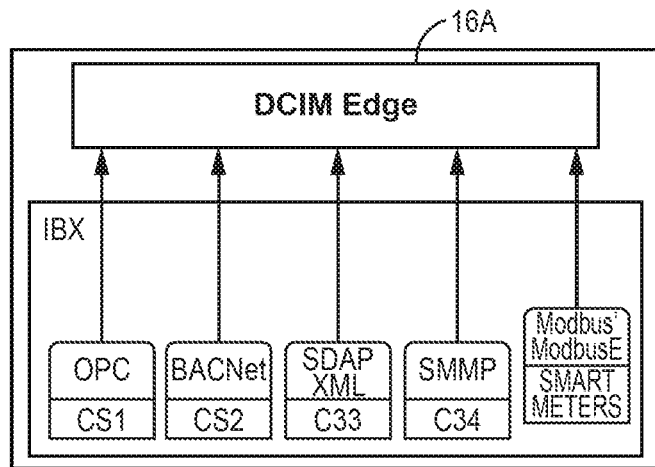
FIGS. 7A-7C are block diagrams illustrating various example infra assets access patterns by a DCIM edge system.
Figure 7B:
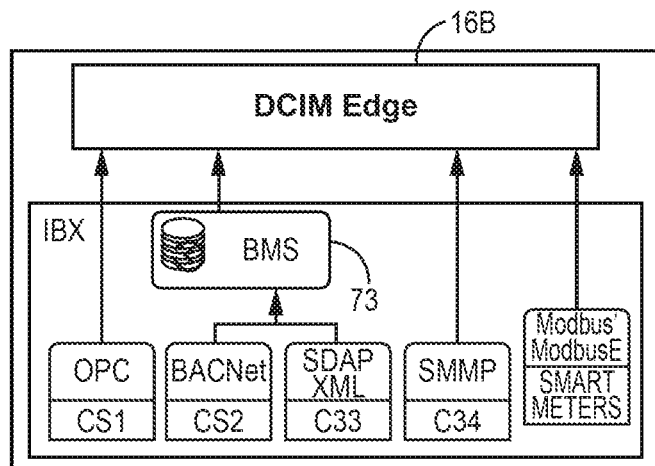
Figure 7C:
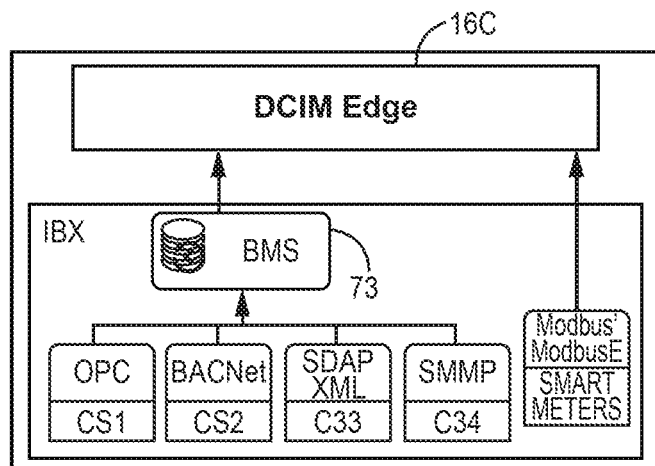

FIGS. 7A-7C are block diagrams illustrating various example infra assets access patterns by a DCIM edge system 16A. In the example of FIG. 7A, DCIM edge system 16A may access only control systems CS1-CS4 in a data center (IBX). This may be the case when a building management system (BMS) does not exists or is not connected, or does not have high level interfaces. In the example of FIG. 7A, DCIM edge system 16A interfaces directly with control systems or smart meters using respective protocols such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example, which may be known protocols (although this may vary based on some proprietary control systems). In this example, data collection from the control systems may be either Change of Value (COV)/subscription based (data is collected only when there is a change in value) or polling-based.

In the example of FIG. 7B, DCIM edge system 16A may follow a hybrid access model, accessing some control systems directly and accessing some control systems via a BMS 73. This may be the case when a BMS exists and can act as mediator, but not all control systems are connected with BMS 73. In this example, data collection from BMS 73 may be polling based, and data collection from Control Systems is either COV/subscription based or polling based, depending on the protocol. In some examples, BMS 73 can potentially put additional constraints, if BMS capabilities are subpar relative to those of the control systems.

In the example of FIG. 7C, DCIM edge system 16A may access control systems only via the BMS 73 in a data center (IBX). This may be the case when a BMS 73 exists and can act as a mediator between DCIM edge system 16A and all of the control systems. This approach may leverage a BMS's existing integration with Control systems. In some examples, BMS 73 can potentially put additional constraints, if BMS 73 capabilities are subpar relative to those of the control systems. In this example, data collection from BMS 73 may be polling based.

Figure 8:
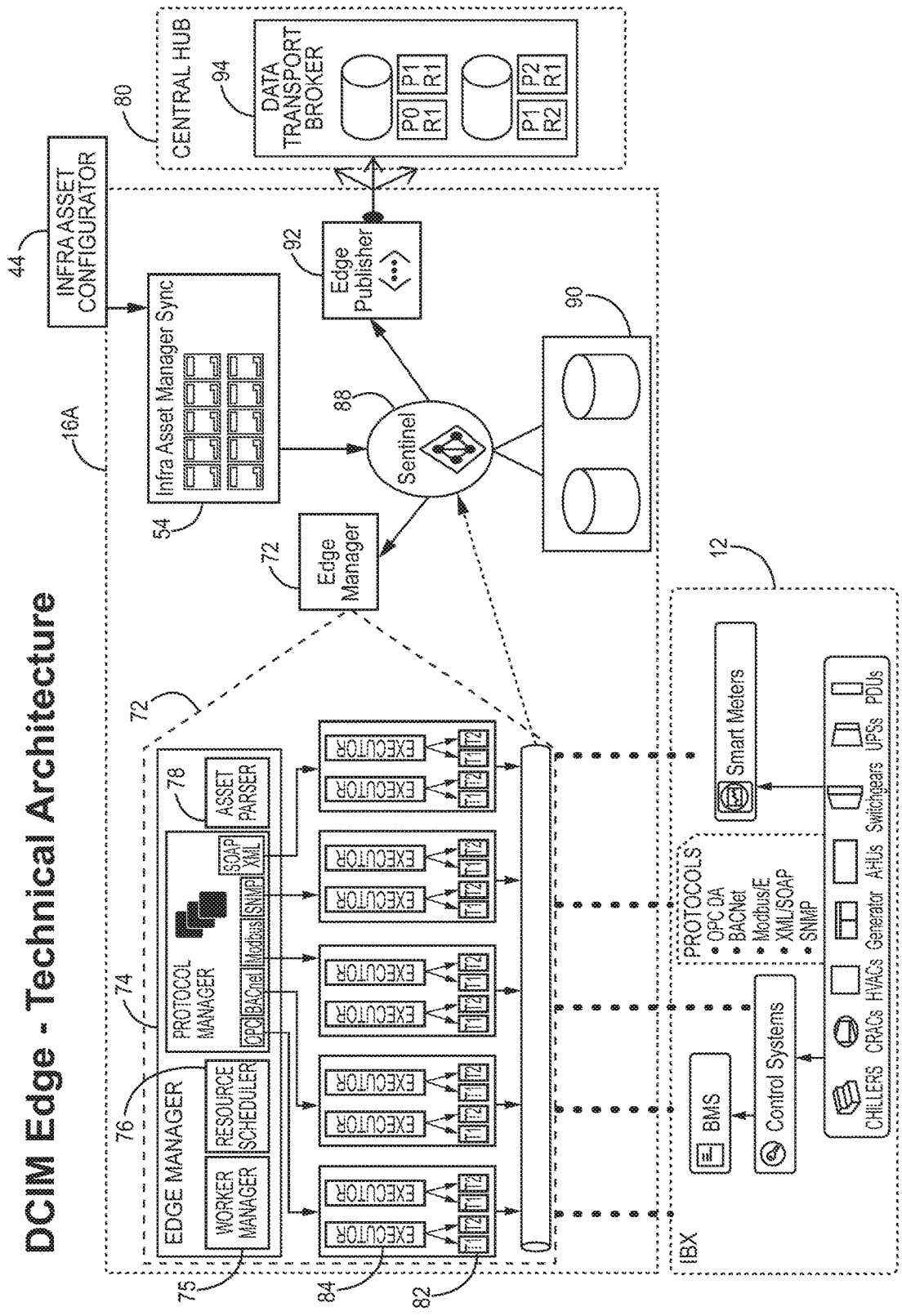
FIG. 8 is a block diagram illustrating an example edge system in a data center infrastructure monitoring system, in accordance with techniques described herein.

FIG. 8 is a block diagram illustrating an example edge system in a data center infrastructure monitoring system, in accordance with techniques described herein. FIG. 8 illustrates a DCIM edge system, such as DCIM edge system 16A of FIG. 4, in further detail. In the example of FIG. 8, the assets and asset models defined and uploaded within the infrastructure asset configurator 44, as described above, are received by an edge manager 72 of DCIM edge system 16A via infra asset manager synchronizer 54. A protocol manager 74 within the edge manager 72 receives the defined asset models for particular instances, and selects a protocol for that defined asset model. In the example of FIG. 7, edge manager 72 also includes a worker manager 75, a resource scheduler 76 and an asset parser 78.

In some examples, protocol manager 74 may automatically discover devices and instruments that come into the network. Executors 84 are software components that query the BMS or components to get the data from them. Edge manager 72 may be configured to automatically detect those systems that come into the system in the IBX, and automatically select the right protocol to communicate with those systems, and automatically start collecting data from them. Edge manager 72 does this all without requiring manual configuration of the systems at the DCIM edge system 16 (e.g., without requiring manual entry of the IP addresses and/or protocols to use for communicating with the sensors, BMS or control systems in the IBXs). In some examples, the customers may want to install devices themselves, and the customer could submit a list of trusted devices to DCIM edge 16A, and then the DCIM edge system could automatically discover the trusted devices.

Infra asset configurator 44 is where all the asset models are defined, such as by using asset templates, for example. As one example, a template may specify how to connect to an asset such as a generator (what protocol does the generator use to communicate), what are the data points available from the generator. This information is all in the asset model defined by the infra asset configurator 44. IBX operations team may upload info into infra asset configurator 44, for example.

Infra asset configurator 44 may create the asset model payload and stream the asset model payload to DCIM edge 16A, at local IBX environment. Protocol manager 74 receives the asset model for that particular asset, and then parses the asset model to identify the protocol to use for communicating with particular assets in the IBX.

Resource scheduler 76 determines how many executors are needed to process the data from the devices, such as based on the number of devices. Executors 84 are distributed processing software components. In some examples, in a central cloud compute infrastructure, the executors 84 may be endpoints driven by microservices. Edge manager 72 dynamically spins up more executors, and resource scheduler 76 schedules more executors based on need.

Protocol manager 74 manages a plurality of different executors 84 and threads (T1, T2) 82, with two threads per executor 84 in the example of FIG. 8. Protocol manager 74 sends a particular part of the payload to an executor 84. Executor 84 looks at the many different tag points and applies some grouping logic to group the tag points. The grouping is based on one or more parameters, such as poll frequency and bucket size, for example. For example, executor 84 may group the tag points that should be polled at the same time. Threads T1 and T2 82 for an executor will then poll the tag points at the IBX 12 and pull the data for the group of tags at the appropriate poll frequency. A given thread 82 is associated with a given group of tags, as grouped by executor 84. Some protocols send data based on events, and edge manager 72 subscribes to the protocol to receive event-driven data updates.

Worker manager 75 is a lifecycle manager. Worker manager 75 manages the lifecycle of the executors 84. If an executor 84 crashes, worker manager 75 brings the executor 84 back to a safe state. Resource scheduler 76 interacts with worker manager 75.

Executors 84 then store the data to database(s) 90, e.g., via a data hub such as sentinel 88. Stored data may include an asset ID, a data value, and a timestamp indicating a time the data was obtained, as an example. From there, database 90 publishes the data to edge publisher 92 which in turn sends the data to a data broker 94 of central hub 80.

Figure 9:
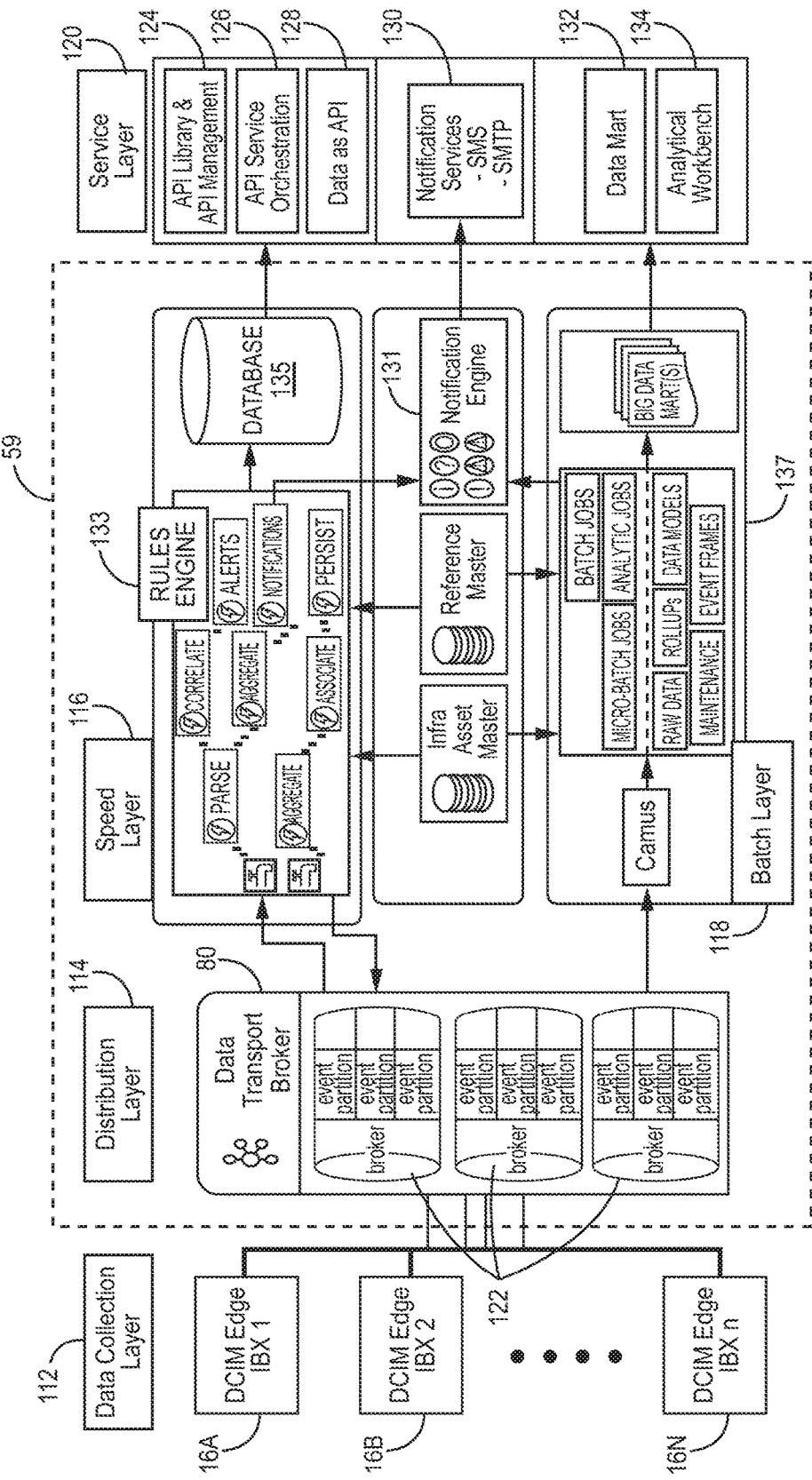
FIG. 9 is a block diagram illustrating an example data center gateway data platform in a data center infrastructure monitoring system, in accordance with techniques described herein.

FIG. 9 is a block diagram illustrating an example data center gateway data platform technical architecture 110 in a data center infrastructure monitoring system, in accordance with techniques described herein. In the example of FIG. 9, an architecture of data platform 59 includes a data collection layer 112, a distribution layer 114, a speed layer 116, and a batch layer 118 located within data platform 59, and a service layer 120. Data is transmitted from multiple DCIM edge systems 16A-16N associated with multiple data centers 12 of data collection layer 112, and received by associated brokers 122 of data transport broker 86 within distribution layer 114.

Batch layer 118 includes a big data pipeline, such as Camus, which runs as a job and consumes data from data transport broker 86 into a distributed file system, for example. Batch layer 118 may include batch jobs, micro-batch jobs, analytics jobs, raw data, roll-ups, data models, maintenance, and event frames, for example. These may receive data from infra asset master and reference master, and feed into notification engine 131 and big data mart(s). Data from the big data mart(s) of batch layer 118 may then go to data mart 132 and analytical workbench 124, for example.

Speed layer 116 may aggregate, associate, and persist DCIM asset events received from data transport broker 86. Speed layer 116 may parse DCIM asset events, correlate and/or aggregate events, and identify events that warrant alerts. For example, speed layer 116 may include a rules engine 133 that applies alert rules and notifies notification engine 131 when alert-worthy events are detected based on the alert rules. In some examples, rules engine 133 applies business rules for real-time processing of asset events. For example, a rule may specify that whenever a particular tag point goes beyond a configured threshold, raise an alarm (e.g., a temperature goes above a threshold temperature). A raised alarm may be one example of an asset event. The alert rules may be created in response to receiving the user inputs configuring alerts, and, for example, may be conditional alerts, as described later In some examples, speed layer 116 may store a customer-to-device association, and may also have access to a maintenance schedule for a customer. In this example, speed layer 116 may determine that a device is not sending data, associate the device with the customer, and determine that the maintenance schedule for the customer indicates that the device is planned to be down for maintenance. In this case, speed layer 116 will not identify the device not sending data as an event warranting an alarm.

Speed layer 116 may also store or access information defining a hierarchy of assets that indicates how the assets are connected and/or the interdependency between assets. In some examples, a hierarchy of assets may specify a primary asset and a corresponding backup asset. When rules engine 133 identifies that an asset has triggered a rule, speed layer 116 can associate the asset with other related assets to identify other assets that may be affected by a raised alarm in an asset. For example, if a primary asset becomes non-operational, speed layer 116 may determine that a corresponding backup asset will become operational as a result. In some examples a power and electrical hierarchy may indicate whether power and electrical are running on a primary asset or a backup asset. This may be referred to as resiliency status. The speed layer 116 provides this information back to the data center operations team, e.g., via notification services or dashboard APIs, so the team has an overall idea of how the power chain and mechanical chains are operating.

Figure 15:
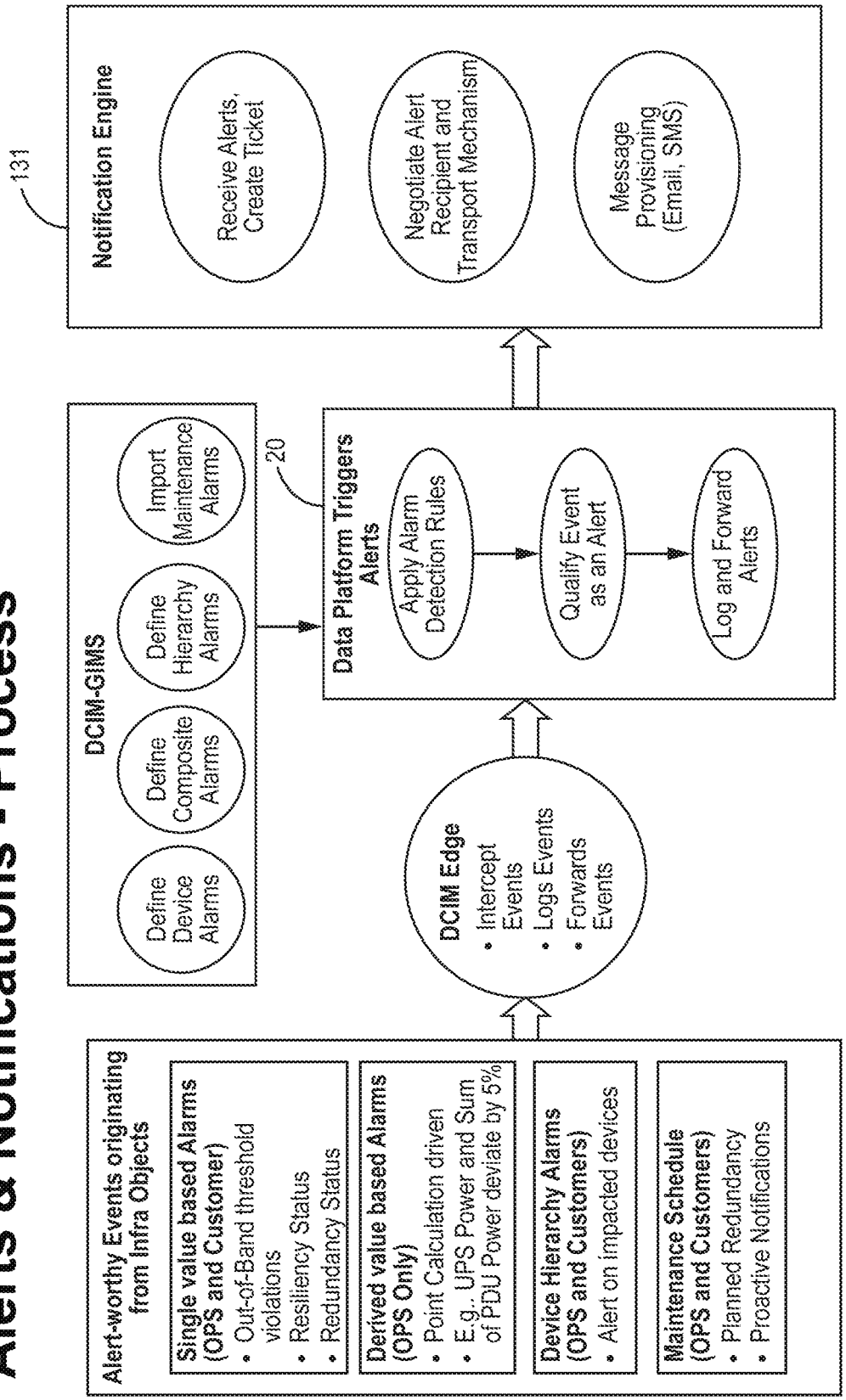
FIG. 15 is a block diagram illustrating an example alerts and notification process in a data center infrastructure monitoring system, in accordance with techniques described herein.
Figure 19:
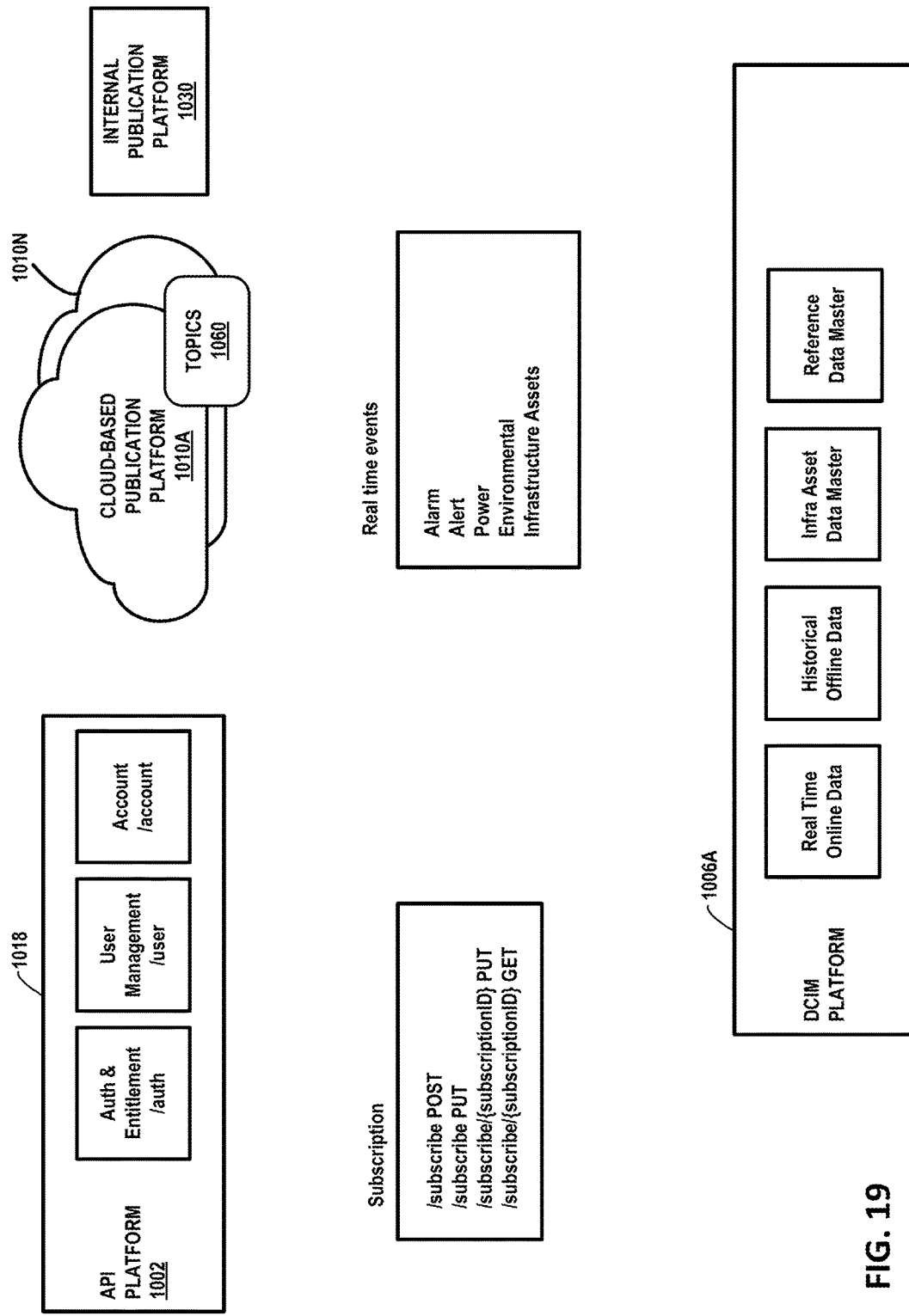
FIG. 19 is a block diagram illustrating example features of a real-time partner API catalog for obtaining near real-time events from a DCIM platform that monitors one or more data centers, according to techniques described herein.

Notification engine 131, described in further detail with respect to FIG. 15, provides notification services based on alerts received from the batch layer and/or speed layer. For example, the alerts may be configured as described herein with respect to FIGS. 30-33. Speed layer 116 stores indications of asset events to a database 135 (e.g., Cassandra) and to an analytical layer 137 (e.g., Hadoop) in the batch layer that may be used for running reports later, etc. The database 135 provides data to API library and API management 124, API service orchestration 126, and data as API 128 of service layer 120. The service layer 120 may display information by a custom dashboard, e.g., using APIs. An example custom dashboard is shown in FIG. 19.

Service layer 120, which receives the data from data platform 59, includes API library and API management 124, API service orchestration 126, data as API 128, notification services 130, such as SMS and SMTP, a data mart 132 and an analytical workbench 134.

Figure 10:
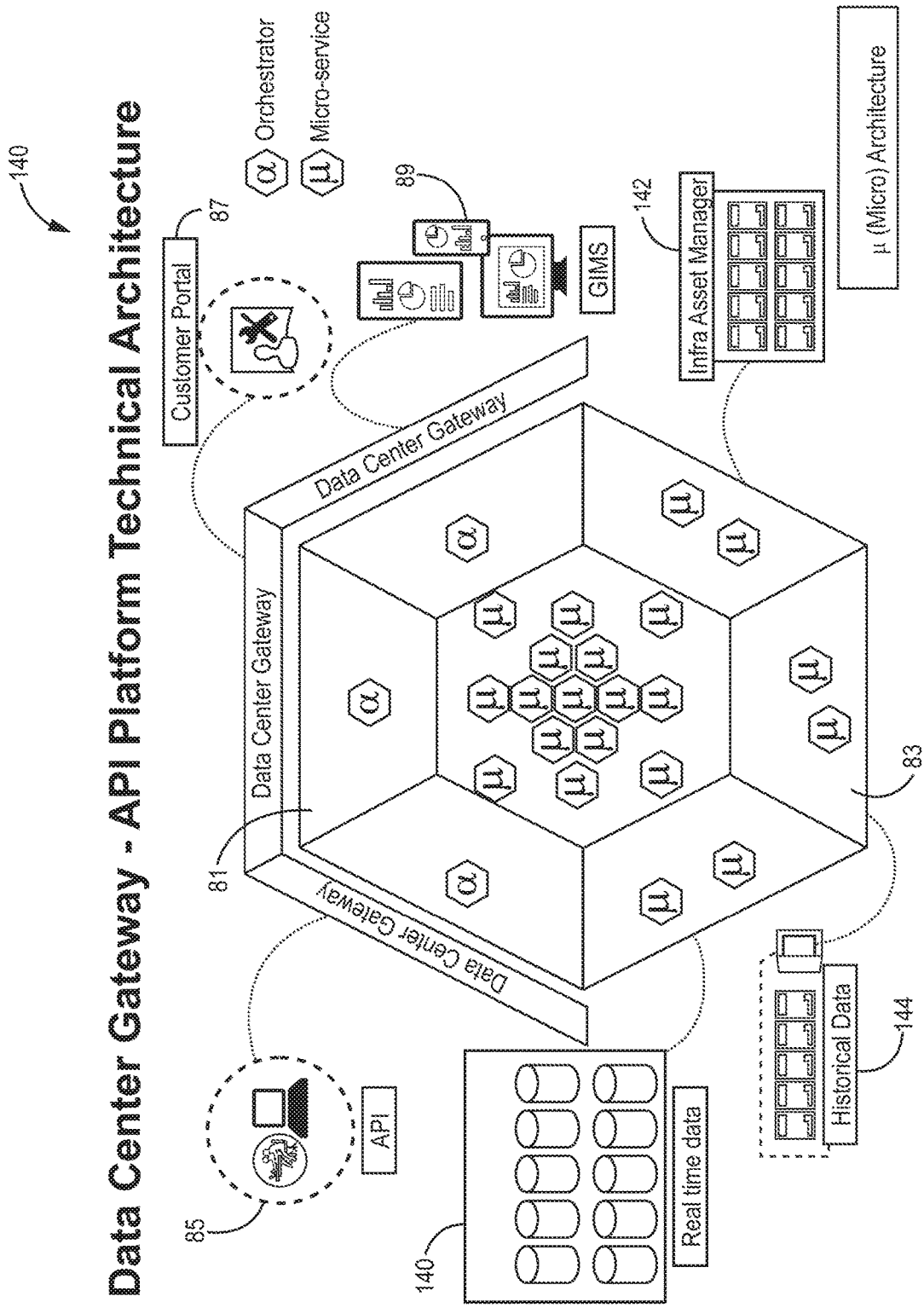
FIG. 10 is a block diagram illustrating an example application programming interface (API) in a data center infrastructure monitoring system, in accordance with techniques described herein.

FIG. 10 is a block diagram illustrating an example application programming interface (API) in a data center infrastructure monitoring system, in accordance with techniques described herein. In the example of FIG. 10, an example API platform technical architecture 140 includes orchestrator 81 for transmitting real time data 140, and historical data 142, and data with infra asset manager 144. Underlying data service 83 (micro-services) provides API endpoints that can be invoked by customer applications, such as customer APIs 85, customer portals 87 and global IBX management system (GIMS) 89. In the example of FIG. 10, there may be different microservices for each of real-time data 140, historical data 144, and infra asset manager 144, for example.

In some examples, the API platform described herein may be an application platform as described in U.S. application Ser. No. 14/927,451, entitled INTERCONNECTION PLATFORM FOR REAL-TIME CONFIGURATION AND MANAGEMENT OF INTERCONNECTIONS WITHIN A CLOUD-BASED SERVICES EXCHANGE, filed Oct. 29, 2015, the entire contents of which are incorporated by reference herein. Orchestrator 81 may be an orchestrator/orchestration engine as described in U.S. application Ser. No. 14/927,306, entitled ORCHESTRATION ENGINE FOR REAL-TIME CONFIGURATION AND MANAGEMENT OF INTERCONNECTIONS WITHIN A CLOUD-BASED SERVICES EXCHANGE, filed Oct. 29, 2015, the entire contents of which are incorporated by reference herein.

Customer portals 87 may utilize various approaches, such as using an existing customer portal container and/or an existing customer portal architecture, for example. In another embodiment, customer portals 87 may utilize a customer portal/DCIM hybrid design, including DCIM a specific additional container, and replicates skin, navigation and layout, along with URL switching split (mostly leveraging the customer portal team) for a common approach. Such a CP/DCIM hybrid design aligns with a customer portal strategy of feature based development of an uber portal concept. According to another example, customer portals 87 may utilize an uber portal with customer portal and DCIM design may be utilized that follows uber architecture guidelines, uses feature based application deployment, and uses DCIM as an on-boarding application. According to yet another example, a customer portal with embedded DCIM user experience design (UX) may be utilized that includes features such as static content in the customer portal 87, and in which the dynamic part of DCIM is called from the DCIM backend. Customer portal with embedded DCIM UX may invoke DCIM services using a java-script framework, and which invokes DCIM. In this way, customer portals 87 leverages existing customer portal integrations with an internet protocol (IP) portal for permissions and existing message center for alerts and notifications.

GIMS may be associated with a number of possible operational activities. For example, GIMS 89 may be associated with operational management of power usage effectiveness (PUE), alerts and alerts, along with management of templates, assets, points and access controls. GIMS 89 may also be associated with real time analytics of historical data trends, asset maintenance, consistent asset view, asset status and fault information. In another example, GIMS may be associated with simulation and prediction of asset hierarchy traversal, one line diagram-what-if analysis, and time based query rules.

Figure 11:
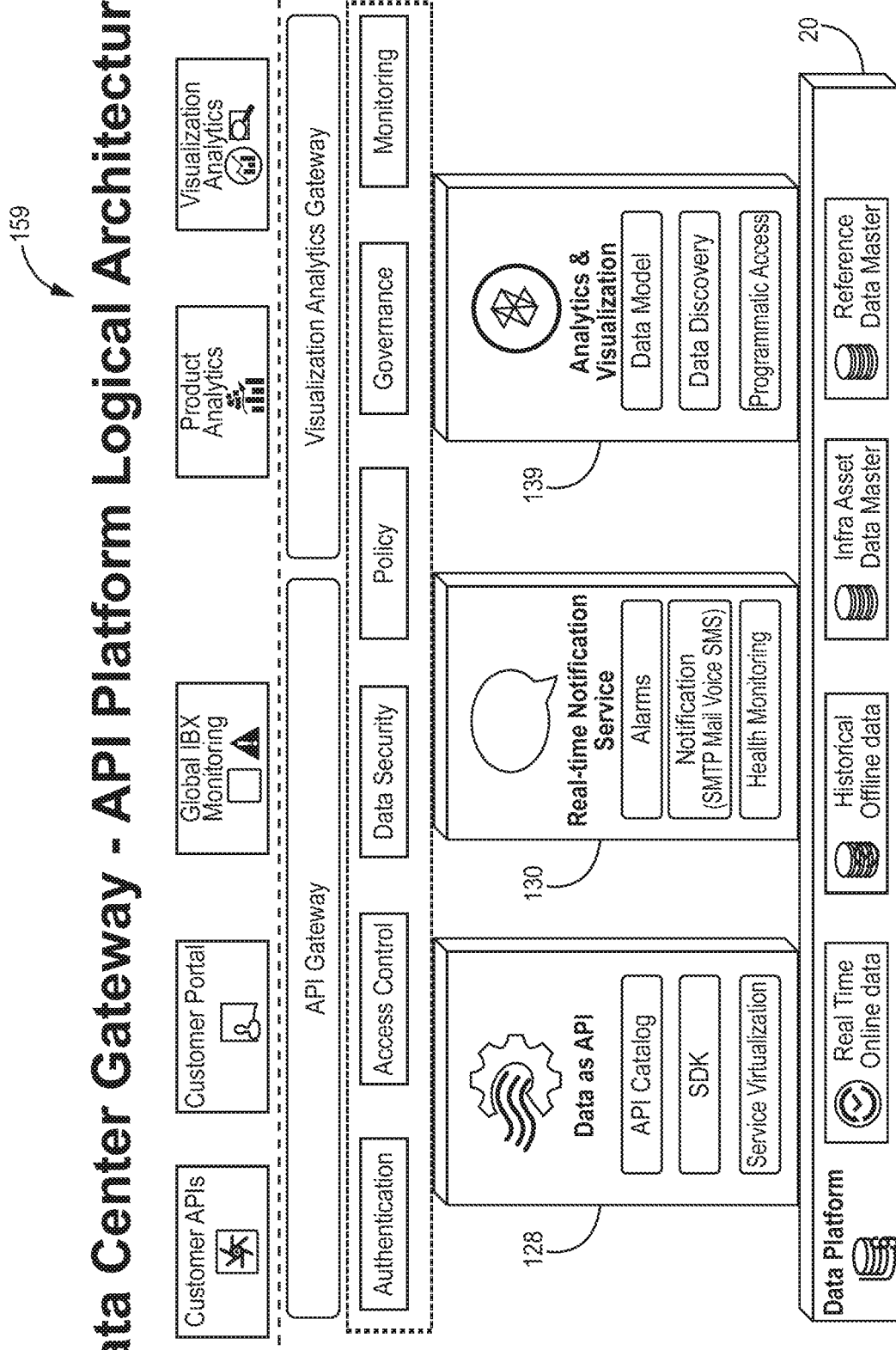
FIG. 11 is a block diagram illustrating an example data center gateway API platform logical architecture for a data center gateway, in accordance with one or more aspects of this disclosure.

FIG. 11 is a block diagram illustrating an example data center gateway API platform logical architecture 159 for a data center gateway, in accordance with one or more aspects of this disclosure. Data platform 20 corresponds to data platform 20 of FIG. 1. Data platform 20 may include real time online data, historical offline data, infra asset data master, and reference data master. Data as API 128, real-time notification services 130, and analytics and visualization 139 are shown in FIG. 11 as logically operating on top of data platform 20.

Data as API 128 may include, for example, an API catalog, software development kit (SDK), and service virtualization. Real-time notification services 130 may include, for example, alarms, notifications (e.g., by SMTP, mail, voice, and/or SMS), and health monitoring. Analytics and visualization 139 may include, for example, data model, data discovery, and programmatic access. Customer APIs, customer portal, global IBX monitoring, product analytics, and visualization analytics may access data via API gateway and/or visualization analytics gateway, such as via API endpoints for authentication, access control, data security, policy, governance, and monitoring, for example. Monitoring APIs may provide, for example, environmental information such as humidity or temperature data from sensors, alerts from alarms, which customers may access by invoking customer APIs by the API gateway.

For example, a customer may send an API request by a customer API, where the API request invokes a monitoring API endpoint. The request payload may specify the monitoring API endpoint, and may specify particular monitoring information that is requested, such as information from particular sensor(s) for example. API gateway may access data from the data platform to service the API request, and may include the data (e.g., environmental information such as sensor data) in the API response payload.

Figure 12:
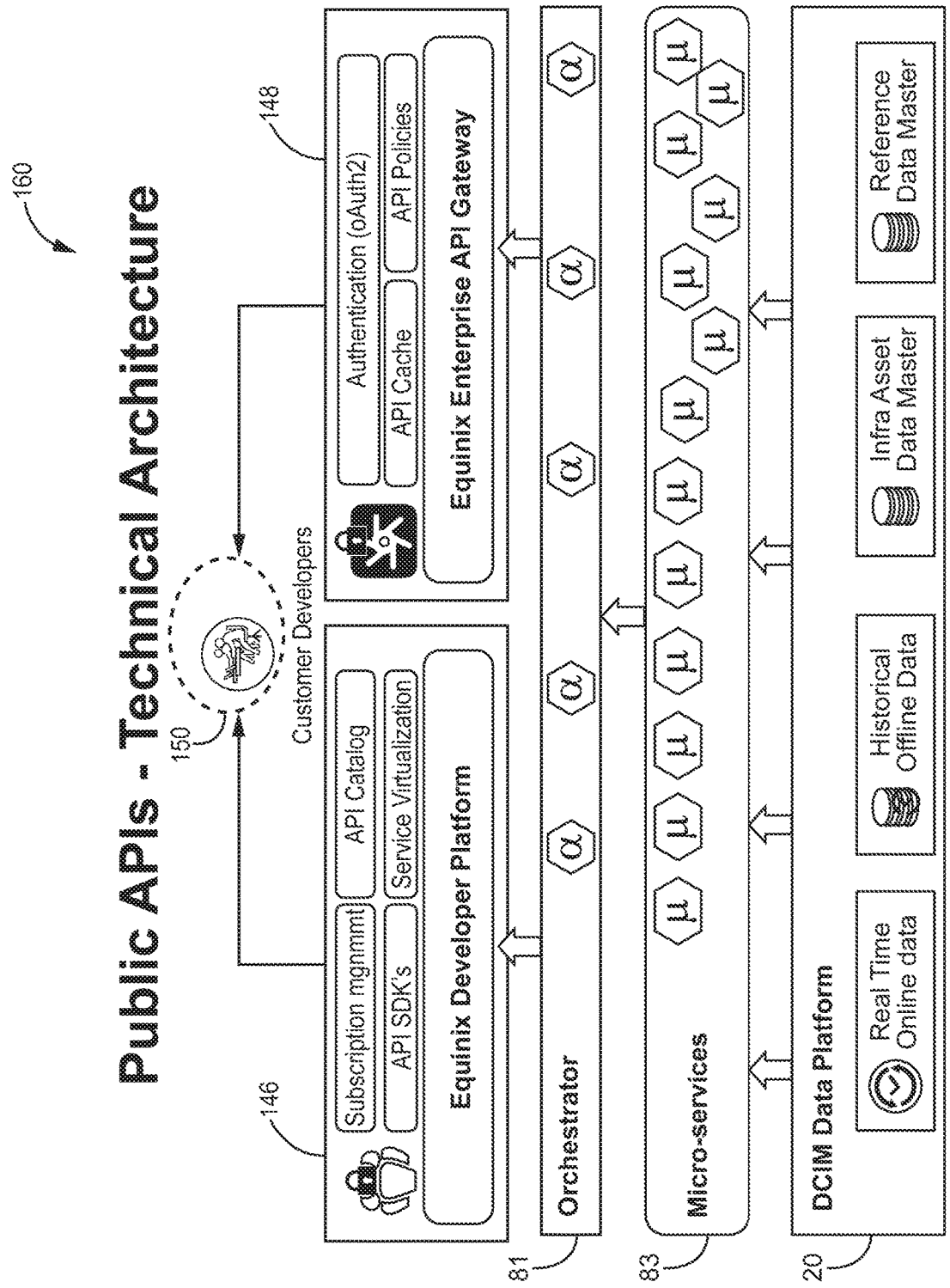
FIG. 12 is a block diagram illustrating an example technical architecture for public application programming interfaces (APIs) interfacing with a data center infrastructure monitoring system data platform, in accordance with techniques described herein.

FIG. 12 is a block diagram illustrating an example technical architecture for public application programming interfaces (APIs) 160 interfacing with a data center infrastructure monitoring system data platform, in accordance with techniques described herein. In the example of FIG. 12, asset data is received from DCIM data platform 20 by underlying micro-services 83 and orchestrator 81. In the example of FIG. 12, DCIM data platform 20 includes real time online data, historical offline data, data associated with an infra asset data master, and data associated with a reference data master. Orchestrator 81 provides an orchestration layer that can break down customer API requests into workflows for accessing the underlying micro-services 83. In some examples, micro-services 83 may be provided as part of a full-stack development framework execution environment to facilitate application development for microservice-based application architectures, such as described by U.S. application Ser. No. 14/927,315, entitled MICRO SERVICE-BASED APPLICATION DEVELOPMENT FRAMEWORK, filed Oct. 29, 2015, the entire contents of which are incorporated by reference herein.

A developer platform 146 and an enterprise API gateway 148 receive the asset data from orchestrator 81, and the resulting managed and authenticated asset data is transmitted to customer developers 150. In the example of FIG. 12, developer platform 146 includes subscription management, API software development kits (SDKs), an API catalog, and service virtualization. In the example of FIG. 12, enterprise API gateway 148 includes authentication (e.g., oAuth2), an API cache, and API policies. In some examples, the technical architecture shown in FIG. 12 may leverage a cloud exchange model for customer onboarding using developer platform 146 of the co-location facility provider. The technical architecture may also leverage the enterprise API gateway 148 of the co-location facility provider for all DCIM APIs. The technical architecture may also leverage BMS APIs and enhance the API catalog and SDKs. In some examples, the technical architecture of FIG. 12 may use a sandbox approach for APIs. In some examples, the microservices and orchestrator that are used for customer portal 87 and/or applications internal to the co-location facility provider may be reused for customer APIs.

Figure 13:
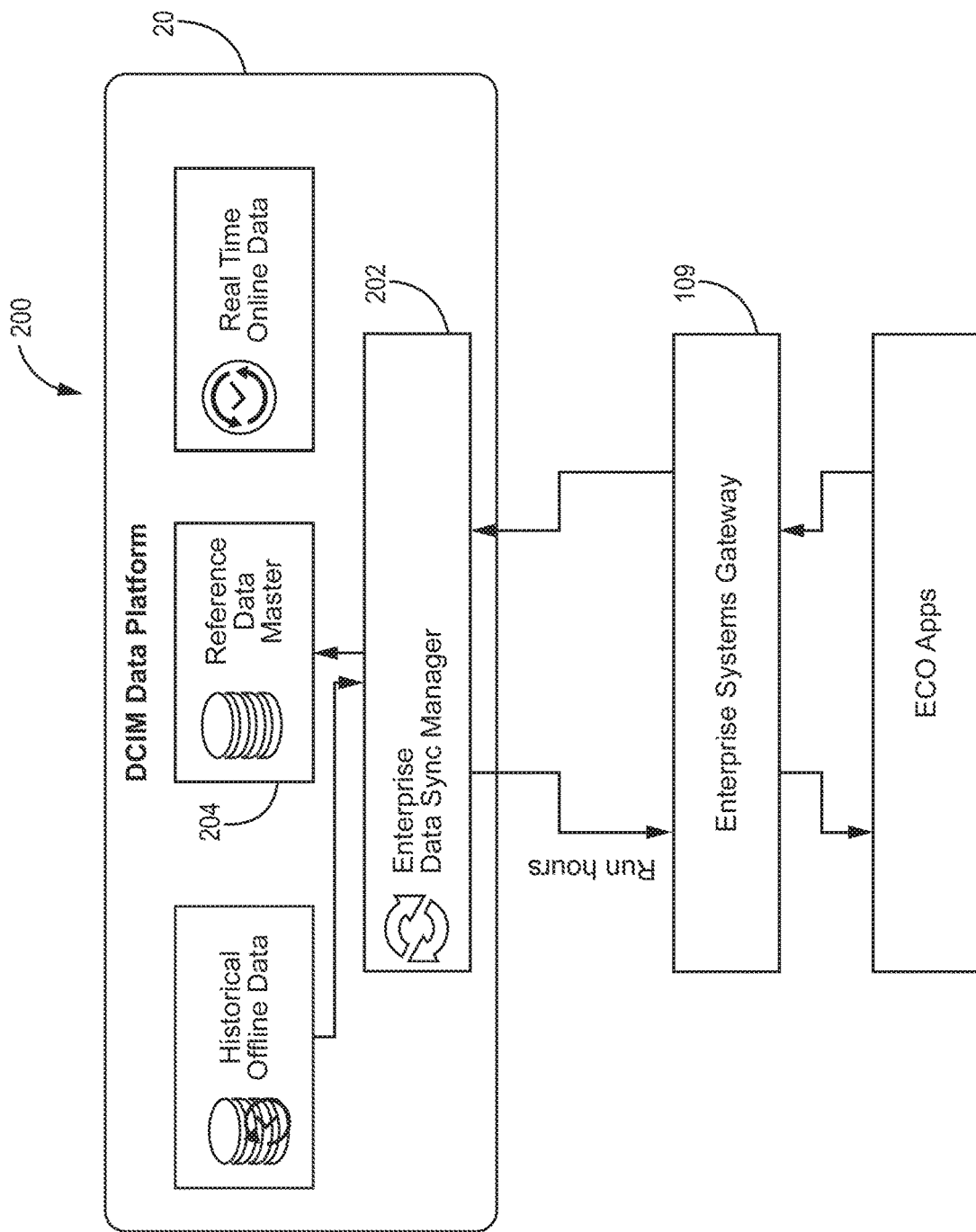
FIG. 13 is a block diagram illustrating an example system in which other IT systems are integrated with the DCIM data platform, in accordance with one or more aspects of this disclosure.

FIG. 13 is a block diagram illustrating an example system 200 in which other IT systems are integrated with the DCIM data platform 20, in accordance with one or more aspects of this disclosure. In the example of FIG. 13, DCIM data platform 20 includes historical offline data, real time online data, a reference data master 204, and enterprise data synchronization master ("enterprise data sync master") 202. In some examples, reference data master 204 may obtain enterprise systems data via enterprise data sync manager 202.

In some examples, DCIM data platform 20 leverages an Enterprise Systems Gateway 109 to obtain data for enterprise systems. In some examples, DCIM data platform 20 obtains cage, cabinet and space drawings from a data management software system of the co-location facility provider. In some examples, DCIM data platform 20 obtains Electrical Infrastructure Assets information and maintenance information from an enterprise asset management (EAM) software system. DCIM data platform 20 may write Electrical infrastructure assets run hours back to the EAM software system at Enterprise Systems Gateway 109. Enterprise Systems Gateway 109 may interact with ECO applications for engaging or managing data centers and systems.

Figure 14:
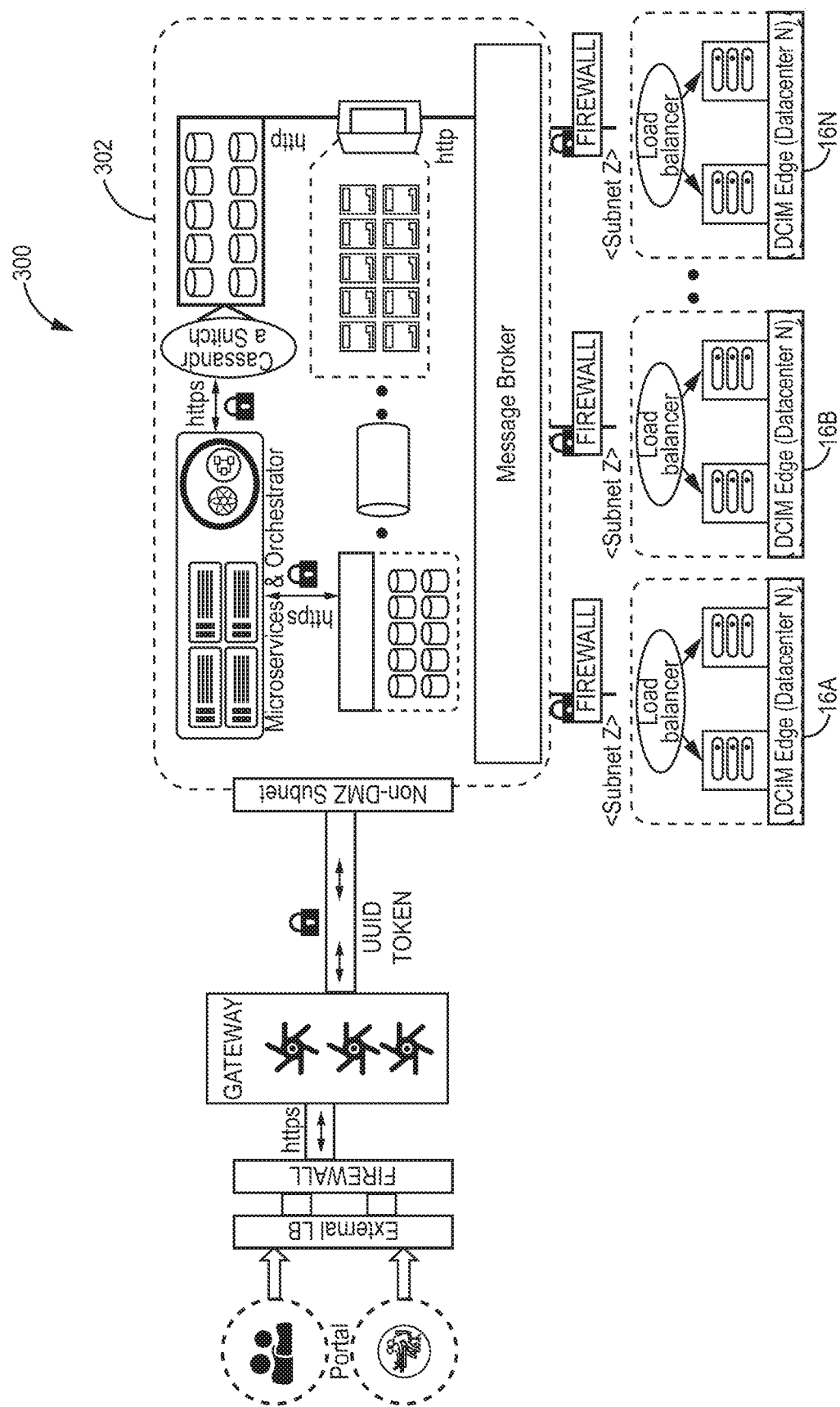
FIG. 14 is a block diagram illustrating a system showing an example security configuration for components of a DCIM system, in accordance with one or more aspects of this disclosure.

FIG. 14 is a block diagram illustrating a system 300 showing an example security configuration for components of a DCIM system, in accordance with one or more aspects of this disclosure. DCIM system 302 may correspond to DCIM system 22 of FIG. 1 and/or data platform 59 of FIG. 9, for example. As shown in the example of FIG. 14, DCIM edge data center and associated DCIM edge system 16 is secured by its own subnet. System 300 includes various firewalls, which may be data center-level next generation firewalls and security. DCIM edge systems 16 may use SSL-based communication between DCIM edge systems 16 and message broker. Secure connection will be enabled between Microservices and database. A data center gateway authenticates external requests via OAuth and generate a unique identifier (UUID). In some examples, the data center gateway may have secured geo-redundancy for database and message broker.

FIG. 15 is a block diagram illustrating an example alerts and notification process in a data center infrastructure monitoring system, in accordance with techniques described herein. As shown in FIG. 15, alert-worthy events originate from infrastructure objects ("infra objects"). Alert-worthy events may include, for example, single value based alarms, derived value based alarms, device hierarchy alarms, and maintenance schedule alarms. Single value based alarms may include, for example, out-of-band threshold violations, resiliency status, and redundancy status. Derived value based alarms may include, for example, point calculation driven alarms, e.g., UPS power and sum of PDU power deviate by 5% from a threshold value. Device hierarchy alarms may alert on impacted devices, for example. Maintenance schedule alarms may include alarms/notifications based on planned redundancy and proactive notifications, for example.

In some examples, single value based alarms, device hierarchy alarms, and maintenance schedule alarms may each be configurable by data center operations administrators and/or by customer administrators. In some examples, derived value based alarms may be configurable only by data center operations administrators and not by customer administrators. For example, data center operations administrators or customer administrators may enter configuration data (e.g., via a customer portal or global IBX monitoring system) for creating and defining device alarms and setting alarm threshold values, defining composite alarms, defining hierarchy alarms, and importing maintenance alarms.

As shown in FIG. 15, a DCIM edge system (e.g., any of DCIM edge systems 16 described herein) intercepts the events originating from the infra objects, logs the events, and forwards the events to the data platform 20. Data platform 20 triggers alerts, such as by applying the configured alarm detection rules. Data platform 20 qualifies an event as an alert based on the applications of the rules, and logs and forwards the alerts to notification engine (e.g., notification engine 131 of FIG. 8). Notification engine 131 receives the alerts and creates tickets for the alerts (e.g., a ticket for each alert). Notification engine 131 negotiates the alert recipient and transport mechanism. Notification engine 131 provides message provisioning, e.g., via email using Simple Mail Transfer Protocol (SMTP) or Short Message Service (SMS).

Figure 16:
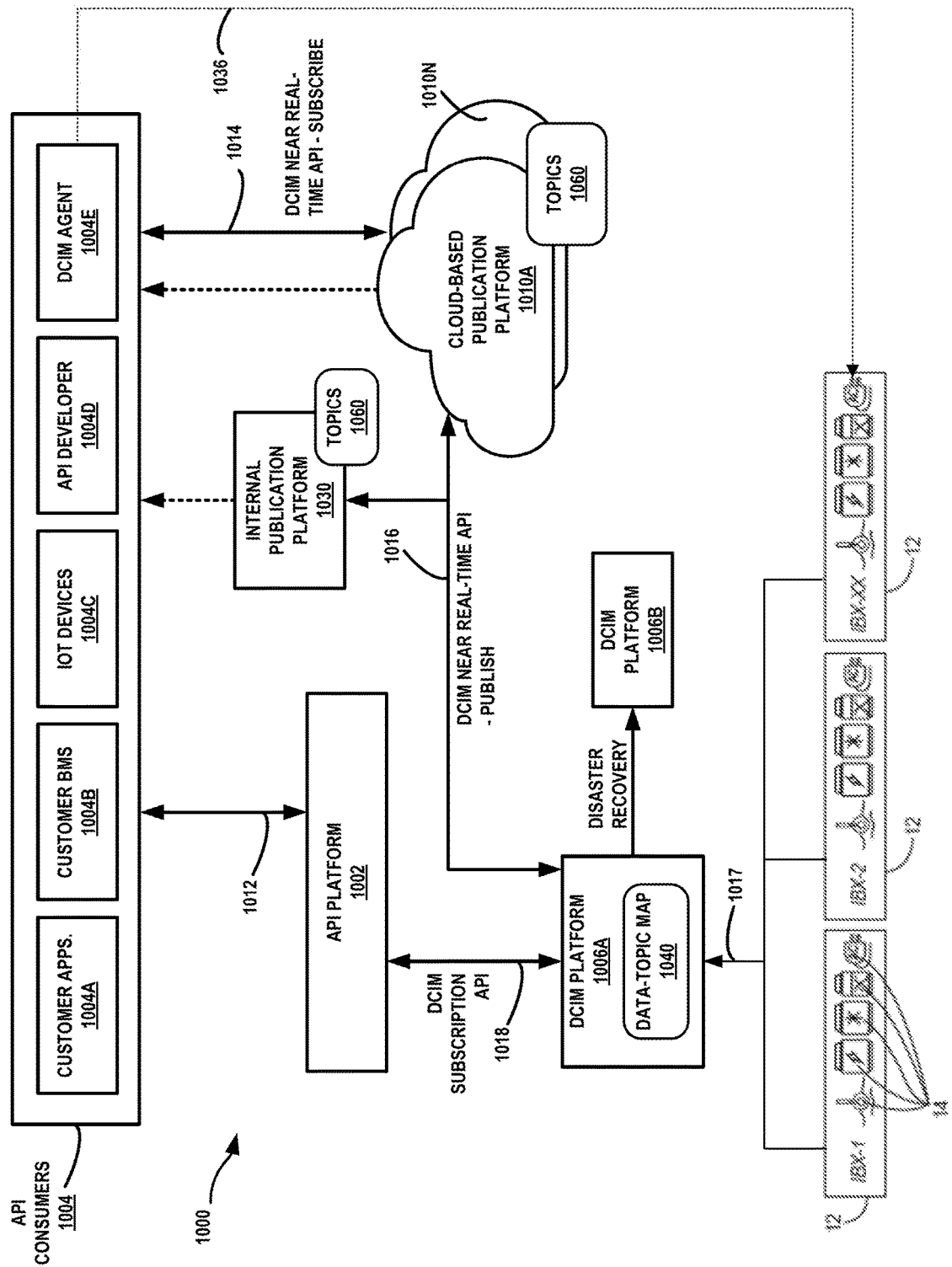
FIG. 16 is a block diagram illustrating an example system for a messaging service that applies real-time processing to data center events and publishes the processed events to custom topics of a publication platform in near real-time, according to techniques described herein.

FIG. 16 is a block diagram illustrating an example system for a messaging service that applies real-time processing to data center events and publishes the processed events to custom topics of a publication platform in near real-time, according to techniques described herein. Computing system 1000 may represent an example of DCIM system 22 and other DCIM system architectures described in this disclosure. Computing system 1000 includes an API platform 1002, a primary data center infrastructure monitoring platform 1006A, and in some examples a backup data center infrastructure monitoring platform 1006B for disaster recovery. Computing system 1000 receives registration requests for access to events (also referred to as "asset events" elsewhere in this disclosure) from API consumers 1004, which may include customer applications 1004A of customers of the data center provider, customer building management systems 1004B for the customers, Internet of Things (IoT) devices 1004C, API developers 1004D developing applications, and DCIM agent 1004E.

One or more of data centers 12 may include a corresponding DCIM agent 1004E. For example, IBX-1 may include DCIM agent 1004E deployed by the data center provider of data centers 12. Unlike physical infrastructure assets 14 of data centers 12 that produce infrastructure asset data for monitoring by API consumers 1004, DCIM agents 2012 are examples of API consumers 1004. DCIM agent 1004E may represent a light-weight component that may be executed by an execution platform located in the corresponding data center 12 and deployed by the data center provider. Any data center 12 managed by the data center provider may include at least one corresponding instance of a DCIM agent 1004E.

Computing system 1000 includes an API platform 1002 that executes one or more applications to route service requests, received via a communication network 1012, for subscription API 1018. API platform 1002 may operate as an API gateway (or "service gateway"). That is, API platform 1002 operates as a single point of entry for the one or more service instances of DCIM platform 1006A applications and is responsible for service request routing to the service instances. API platform 1002 routes service requests, such as registration requests from API consumers 1004, received at the API platform 1002 to target services offered by the one or more service instances of DCIM platform 1006A applications. API platform 1002 may represent (or include) an example implementation for the API gateway of FIG. 11. API platform 1002 may represent one or more server computing devices and/or virtualized execution environments executing one or more API platform 1002 applications and/or services. Although shown as a single element in FIG. 16, API platform 1002 may execute on a cluster of one or more physical computing devices comprising one or more physical processors and/or virtualized execution environments executing on one or more physical processors.

DCIM platform 1006A represents one or more applications each executing as one or more service instances to expose a subscription API 1018 that includes methods for obtaining existing topics, registering new topics ("registration requests"), deleting topics, and updating topics, for example. In some examples, other methods may alternatively or additionally be used. DCIM platform 1006A may receive asset events (or, more simply, "event data" or "events") from any of the examples of DCIM edge platforms 16 described elsewhere in this document that process real-time data produced by and for infrastructure assets to generate asset events. DCIM platform 1006A may represent an example implementation for data as API 128 and real-time notification services 130 of FIG. 11.

API consumers 1004 may issue registration requests to the API platform 1002 that conform to the subscription API 1018 to invoke the subscription API 1018 methods, examples of which are described in detail below. That is, a registration request may indicate a method of the subscription API 1018, and also specify one or more event subjects of events.

TABLE 3

Subscription API Methods

| Subscription API Method | Description | Example Usage |
| --- | --- | --- |
| subscribeGet/ subscribe | The subscribe GET endpoint allows users to view their respective real-time feeds subscription details. Lists events currently subscribed to. | curl-X GET "https://api.domain. com/real-time/ v1/subscribe" |
| subscribePost/ subscribe | Register for real-time DCIM feeds. The subscribe POST endpoint allows users to register for real-time feeds. User will have the ability to specify the events for each account, data center (IBX) - which will be available as real-time feeds. Depending on the mechanism selected for the real-time feed integration user will have to specify | curl-X POST "https://api. domain. com/real-time/v1/ subscribe" |

TABLE 3-continued

Subscription API Methods

| Subscription API Method | Description | Example Usage |
| --- | --- | --- |
| | configuration parameters. | |
| subscribeSubscriptionIdDelete subscribe/{subscriptionId} | Request to close a real-time feed. The subscribe DELETE endpoint allows users to request close a real-time feed. Events will no longer be published to the topic once a delete request is received. The topic itself may or may not be closed. | curl-X DELETE "https://api.domain. com/real-time/ v1/subscribe/ {subscriptionId}" |
| subscribeSubscriptionIdGet subscribe/{subscriptionId} | The subscribe GET endpoint allows users to view their respective real-time feeds subscription details. Lists events currently subscribed to. | curl-X GET "https://api.domain. com/real-time/ v1/subscribe/ {subscriptionId}" |
| subscribeSubscriptionIdPut subscribe/{subscriptionId} | Update existing subscription to real-time DCIM Feeds. The subscribe PUT endpoint allows user to update an existing subscription to real-time feed to add or remove events. | curl-X PUT "https://api.domain. com/real-time/ v1/subscribe/ {subscriptionId}" |

The following is a detailed description of a subscribeGet method for listing events to which a customer or user is currently subscribed. Header parameters:

TABLE 4

Header parameters

| | |
| --- | --- |
| X-AUTH-USER-NAME* | user id for the request |
| X-AUTH-ORG-ID* | organization id for the user |

An example subscribeGet response status 200 schema:

```
{
    // response object containing subscription details with subscription ID
    power: [ // power event subscription details
        { //object containing the power events the user is registered for
            accountNo: string
            ibx: string
        }
    ]
    tagPoints: [ // asset tag point update event subscription details
        { // request object used to specify the asset events (tag data update) the
          user is registered for
            accountNo: string
            ibx: string
            assetType: string
            assetClassification: string
            assetId: string
            tagId: string
        }
    ]
    alarms: [ // alarms update event subscription details
        { //request object used to specify the alarm events the user is
          registered for
            accountNo: string // customer account number
            ibx: string // ibx code
            assetType: string // asset Type
```

```
        assetClassification: string // asset classification enum
        Enum: Electrical, Mechanical, Environmental
    ]
    alerts: [ // alerts update event subscription details
        { // request object used to specify the alert events the user is
        registered for
            accountNo: string // customer account number
            ibx: string // ibx code
            assetType: string // asset Type
            assetClassification: string // asset classification enum
            Enum: Electrical, Mechanical, Environmental, Power
    ]
    environmental: [ // environmental update event subscription details
        { // request object used to specify the alert events the user is
        registered for
            accountNo: string // customer account number
            ibx: string // ibx code
            levelTypes: [
                string // level type enum
                Enum: ibx, zone, cage, cabinet
            ]
    ]
    resiliency: [ // resiliency update event subscription details
        { // request object used to specify the resiliency events the user
        is registered for
            accountNo: string // customer account number
            ibx: string // ibx code
            assetType: string // asset Type
            assetClassification: string // asset classification enum
            Enum: Electrical, Mechanical
    ]
    subscriptionID: number // unique request number and subscription
    identifier config:
    { // real-time infra provider information - cloud agnostic -
        provider: string // pub/sub provider enum to be used for
        consuming real-time feeds
        Enum: "cloud_provider_1", "cloud_provider_2", "private"
        method: string // subscription method enum
        Enum: PULL, PUSH
        pushurl: string // push url - mandatory when the method is
PUSH
    errors: [
        { // api error object
            code: string // Error Code
            message: string // error message
            more_info: string // details about the error message
            data: { // related data if any }
    ]
```

An example subscribeGet response status 200 schema:

```
{ // api error object
    code: string // Error Code
    message: string // error message
    more_info: string // details about the error message
    data: { // related data if any }
```

The following is a detailed description of a subscribePost method for registering a user for a near real-time feed of events. Header parameters:

TABLE 5

| Header parameters | |
|---|---|
| X-AUTH-USER-NAME* | user id for the request |
| X-AUTH-ORG-ID* | organization id for the user |

An example of a subscribePost body parameters schema for a subscriberPost request:

```
{
    // request object containing list of events the user would like to
    subscribe/register.
```

```
    power: [ // power event subscription details
        { //object containing the power events the user would like to
        subscribe to
            accountNo: string
            ibx: string
        }
    ]
    tagPoints: [ // asset tag point update event subscription details
        { // request object used to specify the asset events (tag data
        update) the user would like to subscribe to accountNo: string
        ibx: string
        assetType: string
        assetClassification: string
        assetId: string
        tagId: string
    ]
    alarms: [ // alarms update event subscription details
        { //request object used to specify the alarm events the user
        would like to subscribe to
            accountNo: string // customer account number
            ibx: string // ibx code
            assetType: string // asset Type
            assetClassification: string // asset classification enum
            Enum: Electrical, Mechanical, Environmental
    ]
    alerts: [ // alerts update event subscription details
        { // request object used to specify the alert events the user would
        like to subscribe to
            accountNo: string // customer account number
            ibx: string // ibx code
            assetType: string // asset Type
            assetClassification: string // asset classification enum
            Enum: Electrical, Mechanical, Environmental, Power
    ]
    environmental: [ // environmental update event subscription details
        { // request object used to specify the alert events the user would
        like to subscribe to
            accountNo: string // customer account number
            ibx: string // ibx code
            levelTypes: [
                string // level type enum
                Enum: ibx, zone, cage, cabinet
            ]
    ]
    resiliency: [ // resiliency update event subscription details
        { // request object used to specify the resiliency events the user
        would like to subscribe to
            accountNo: string // customer account number
            ibx: string // ibx code
            assetType: string // asset Type
            assetClassification: string // asset classification enum
            Enum: Electrical, Mechanical
    ]
    config: [
    { // real-time infra provider information - cloud agnostic -
        provider: string // pub/sub provider enum to be used for
        consuming real-time feeds
        Enum: "cloud_provider_1", "cloud_provider_2", "private"
        method: string // subscription method enum
        Enum: PULL, PUSH
        pushurl: string // push url - mandatory when the method is
PUSH
    ]
```

The example subscribePost response status 200 and status 0 schemas are similar to the example subscribeGet status 200 schemas described above.

The following is a detailed description of a subscribeSubscriptionIdDelete method for deleting a subscription. Path parameters:

TABLE 5

| Path parameters | |
|---|---|
| subscriptionId* | unique identifier for the subscription |

An example of a subscribeSubscriptionIdDelete schema for a subscribeSubscriptionIdDelete status 0 error response:

```
{
    // api error object
    code: string // Error Code
    message: string // error message
    more_info: string // details about the error message
    data: { // related data if any
```

The following is a detailed description of a subscribeSubscriptionIdGet method for getting a subscription identified by a subscription identifier. Path parameters:

TABLE 6

| Path parameters | |
|---|---|
| subscriptionId* | unique identifier for the subscription |

The example subscribeSubscriptionId response status 200 and status 0 schemas are similar to the example subscribeGet status 200 schemas described above.

The following is a detailed description of a subscribeSubscriptionIdPut method for updating a subscription to add or remove events from a near real-time feed. Path parameters:

TABLE 7

| Path parameters | |
|---|---|
| subscriptionId* | unique identifier for the subscription |

Header Parameters:

TABLE 8

| Header parameters | |
|---|---|
| X-AUTH-USER-NAME* | user id for the request |
| X-AUTH-ORG-ID* | organization id for the user |

The example subscribeSubscriptionIdPut is similar to the example subscribePost body parameters schema for a subscriberPost described above. The example response status 200 and status 0 schemas are similar to the example subscribePost status 200 schemas described above.

Using subscription API 1018, DCIM platform 1006A receives from API consumers 1004 registration requests that each represents a request to register for a topic that provides access to near real-time data 1017 generated by infrastructure assets of one or more data centers 12, here illustrated as International Business Exchanges (IBXes), IBX-1 through IBX-XX. A registration request may be an HTTP POST that invokes the subscribePost method one of the above examples from Table 3. Near real-time data 1017 generated by infrastructure assets of one or more data centers 12 may include examples of data collected at one or more DCIM edges and provided to a data platform, as described above, with the data platform here being (or including) DCIM platform 1006A to provide near real-time access to events that describe operations or conditions of infrastructure assets 14 of data centers 12.

Example event types may describe alarm statuses, alert statuses, tagpoint events that include values of infrastructure asset tagpoints, power events describing power consumption by infrastructure assets of the data centers, environmental data describing readings by environmental sensors, and resiliency information that indicates resiliency (e.g., availability of redundant assets, backup, etc.) for infrastructure assets. For instance, a data center 12 may generate a series of events that describe power consumption by a cabinet of the data center 12. As another example instance, a data center 12 may generate may generate a series of events that describe the temperatures determined by a temperature sensor (a type of environmental sensor) at a space within the data center 12.

Each of the events is associated with identifying information (an "event identifier") that uniquely identifies the event subject. Example event identifiers and event subjects include a unique alarm identifier for an alarm object, a unique alert identifier for an alert object, a unique tagpoint identifier for a tagpoint of an asset, an identifier for an infrastructure asset associated with power data, space and sensor identifiers associated with environmental data, and an identifier for an infrastructure asset having some resiliency status. Examples of such event identifiers are provided below in the example event object schemas. In some cases, DCIM platform 1006A generates events using near real-time data 1017 generated by data centers 12. In some cases, near real-time data 1017 includes events. In either case, DCIM platform 1006A obtains the events using near real-time data 1017.

A registration request may specify a customer account, a data center, and a list of event subjects that correspond to near real-time data generated by the specified data center of data centers 12. Each event subject is a subject for one or more events that describe the event subject, and each event may correspond to a different event type describing the type of data for the event and the event subject. Example event subjects include alarm objects, alert objects, infrastructure assets, environmental sensors, and properties ("tagpoints") of infrastructure assets. Registration requests may include event identifiers that uniquely identify the event subject for events for which access is being requested.

The following schema provide example descriptions of example event types for different events obtained and made accessible to API consumers 1004 by the DCIM platform 1006A, according to techniques described in this disclosure:

TABLE 1

| Event types | |
|---|---|
| Event | Description |
| alarm_active | An alarm is currently active |
| alarm_cleared | An alarm has cleared |
| alert_active | An alert is currently active |
| alert_acknowledged | An alert was acknowledged |
| tagpoint_updated | A new tagpoint data value was updated |
| power_updated | A new power consumption datapoint was added |
| environment_updated | A new environmental sensor datapoint was added |
| resiliency_updated | Resiliency information was updated |

Data included in an event is referred to as "event data" and may indicate the type of event and include an object describing the event. The alarm_active event indicates that an alarm was activated. The alarm_active event is sent when an alarm is activated. It can be accessed by all user accounts connected to the alarm. The alarm property is an alarm object containing information about the alarm:

```
alarm_active event
{
```

-continued

```
    "type": "alarm_active",
    "alarm": { ... }
}
```

The alarm cleared event indicates that an alarm was cleared. The alarm cleared event is sent when an alarm is cleared. It can be accessed by all user accounts connected to the alarm. The alarmId is the unique identifier for the alarm object. The eventTs is the timestamp when the event was created in the system. The following is example event data:

```
alarm_cleared event
{
    "type":"alarm_cleared",
    "alarmId":"[\"SV5.UPS-R2:inputbropen\",\"9D59\",\"Alarm\"]",
    "eventTs":"1491419177012"
}
```

The tagpoint_updated event indicates that there is new data generated for a tagpoint of an infrastructure asset. The tagpoint_updated event is sent when a tagpoint data is updated. It can be accessed by all users who have visibility to the tagpoint. The tagPointData property is a TagPointData object containing latest information about the tagpoint:

```
tagpoint_updated event
{
    "type":"tagpoint_updated",
    "tagPointData":{ ... }
}
```

The power_updated event indicates that new power consumption data is received or calculated. A power_updated event is accessible to a user who has access to accounts that own the circuits to which the power consumption data is related to. The powerData property is a PowerData object containing the power consumption information:

```
{
    "type":"power_updated",
    "powerData": { ... }
}
```

The environment updated event indicates that new environment data is updated or calculated. An environment updated event is accessible to user accounts that have a cage/cabinet in a location/data center space related to the environment information. The environmentData property is a EnvironmentData object containing the environment information.

```
{
    "type":"environment_updated",
    "environmentData": { ... }
}
```

The resiliency_updated event indicates that resiliency status for a group of assets is calculated and modified. It is accessible to user accounts that are affected by the asset. The resiliencyData property is a ResiliencyData object containing the resiliency information

```
{
    "type": "resiliency_updated",
    "resiliencyData": { ... }
}
```

Objects included in events describe the subjects of the events, including the updated data points for the subjects of the events. Different types of events have corresponding object types. The following are example schema for event objects included in events.

TABLE 2

Object types

| Object Type | Description |
| --- | --- |
| Alarm | An alarm |
| Alert | An alert |
| TagPointData | A tagpoint reading data |
| PowerData | A power reading data |
| EnvironmentData | An environmental reading data |
| ResiliencyData | Resiliency information |

Alarm Object:

```
{
"type": "object",
"description": "alarm object - properties of the alarm",
"properties": {
    "alarmId": {
        "type": "string",
        "description": "unique identifier for the alarm"
    }
    "timetriggered": {
        "type": "string",
        "description": "time when the criteria for the alarm was met, in epoch (ms)"
    },
    "valuetype": {
        "type": "string",
        "description": "data type for the alarm data point value",
        "enum": [ "Float", "Bool", "Int" ]
    },
    "severity": {
        "type": "integer",
        "description": "integer value which describes the severity of the alarm. Higher values indicate higher severity"
        800-899 - Urgent
        600-699 - High
        400-499 - Low
        200-299 - Informational"
    },
    "timenormalprocessed": {
        "type": "string",
        "description": "time alarm was cleared in the system. "
    },
    "circuit": {
        "type": "string",
        "description": "circuit number applicable to power alarms"
    },
    "alarmtype": {
        "type": "string",
        "description": "alarm type indicates the type of alarm",
        "enum": [ "digital", "absolute", "deviation", "multi-state" ]
    },
    "tagid": {
        "type": "string",
        "description": "tag id linked to the alarm. available for alarms on infra assets. unique identifier for the tag"
    },
    "uom": {
        "type": "string",
        "description": "unit of measure for the alarm value"
    },
    "cage": {
```

```
    "type": "string",
    "description": "cage us id linked to the alarm. available with power
    alarms or environmental alarms"
  },
  "timeprocessed": {
    "type": "string",
    "description": "time when the alarm was created in the system."
  },
  "assetid": {
    "type": "string",
    "description": "asset id linked to the alarm"
  },
  "metro": {
    "type": "string",
    "description": "metro id linked to the alarm"
  },
  "accountno": {
    "type": "string",
    "description": "customer account number"
  },
  "conditionname": {
    "type": "string",
    "description": "condition name for the alarm"
  },
  "region": {
    "type": "string",
    "description": "region linked to the alarm"
  },
  "value": {
    "type": "string",
    "description": "data point value at which the alarm was
    triggered"
  },
  "cabinet": {
    "type": "string",
    "description": "cabinet us id. applicable for power alarms"
  },
  "assettype": {
    "type": "string",
    "description": "Will contain template name for alarms linked to
    infra assets. \"environmental\" for environmental alarms.
    \"CIRCUIT\" for power alarms"
  },
  "ibx": {
    "type": "string",
    "description": "ibx code"
  },
  "status": {
    "type": "boolean",
    "description": "indicator whether an alarm is active"
  },
  "assetclassification": {
    "type": "string",
    "description": "asset classification",
    "enum": [ "Electrical", "Mechanical", "Environmental",
    "Power" ]
  }
}}
```

Alert Object:

```
            "AlertCondition": {
                "type": "object",
                "properties": {
                    "affectedCustomerAsset": {
                        "type": "null"
                    },
                    "alertType": {
                        "type": "null"
                    },
                    "asset": {
                        "type": "string"
                    },
                    "assetname": {
                        "type": "string"
                    },
                    "assettype": {
                        "type": "string"
                    },
                    "condalerttypeid": {
                        "type": "string"
                    },
                    "condassetclassification": {
                        "type": "string"
                    },
                    "condassetid": {
                        "type": "string"
                    },
                    "condcurrentvalue": {
                        "type": "string"
                    },
                    "condeventtype": {
                        "type": "string"
                    },
                    "condtagid": {
                        "type": "string"
                    },
                    "customerAssets": {
                        "type": "null"
                    },
                    "ibx": {
                        "type": "string"
                    },
                    "infraAssets": {
                        "type": "null"
                    },
                    "measurementType": {
                        "type": "null"
                    },
                    "region": {
                        "type": "null"
                    },
                    "section": {
                        "type": "string"
                    },
                    "thresholdUnit": {
                        "type": "string"
                    },
                    "thresholdValue": {
                        "type": "string"
                    },
                    "thresholdValueMax": {
                        "type": "string"
                    },
                    "thresholdValueMin": {
                        "type": "string"
                    },
                    "uom": {
                        "type": "string"
                    }
                }
            },
            "AlertType": {
                "type": "object",
                "properties": {
                    "defaultValue": {
                        "type": "null"
                    },
                    "eventType": {
                        "type": "string"
                    },
                    "id": {
                        "type": "string"
                    },
                    "tagId": {
                        "type": "null"
                    },
                    "type": {
                        "type": "string"
                    },
                    "unit": {
                        "type": "string"
                    },
                    "value": {
                        "type": "string"
                    }
```

```
        }
    },
    "Alert": {
        "type": "object",
        "properties": {
            "accountNo": {
                "type": "string"
            },
            "acknowledge": {
                "type": "boolean"
            },
            "affectedCustomerAsset": {
                "type": "null"
            },
            "alertType": {
                "$ref": "#/definitions/AlertType"
            },
            "alertTypeName": {
                "type": "string"
            },
            "asset": {
                "type": "string"
            },
            "assetclassification": {
                "type": "string"
            },
            "assetname": {
                "type": "string"
            },
            "assettype": {
                "type": "string"
            },
            "conditionalAlert": {
                "$ref": "#/definitions/AlertCondition"
            },
            "country": {
                "type": "string"
            },
            "createdOn": {
                "type": "null"
            },
            "currentvalue": {
                "type": "string"
            },
            "eventtype": {
                "type": "string"
            },
            "ibx": {
                "type": "string"
            },
            "id": {
                "type": "string"
            },
            "lastmaintenance": {
                "type": "string"
            },
            "metro": {
                "type": "string"
            },
            "modifiedOn": {
                "type": "null"
            },
            "notificationType": {
                "type": "string"
            },
            "region": {
                "type": "string"
            },
            "relatedincidents": {
                "type": "string"
            },
            "resiliency": {
                "type": "string"
            },
            "section": {
                "type": "string"
            },
            "severity": {
                "type": "string"
            },
```

```
            },
            "tagid": {
                "type": "string"
            },
            "thresholdUnit": {
                "type": "string"
            },
            "thresholdValue": {
                "type": "string"
            },
            "thresholdValueMax": {
                "type": "string"
            },
            "thresholdValueMin": {
                "type": "string"
            },
            "timeZone": {
                "type": "string"
            },
            "timeacknowledged": {
                "type": "string"
            },
            "timeprocessed": {
                "type": "string"
            },
            "timetriggeredMilisec": {
                "type": "string"
            },
            "triggeredOn": {
                "type": "integer"
            },
            "type": {
                "type": "string"
            },
            "uom": {
                "type": "string"
            },
            "year": {
                "type": "string"
            }
        }
    }
```

TagPointData Object:

```
"TagPointData": {
    "type": "object",
    "description": "Tag Point is a property of the Asset it is linked to.",
    "properties": {
        "value": {
            "type": "string",
            "description": "Current data value for the tag point"
        },
        "tagId": {
            "type": "string",
            "description": "ID for the tagPoint - Unique Identifier
            for the Tag Point"
        },
        "tagDisplayName": {
            "type": "string",
            "description": "Generic label for the tag point"
        },
        "uom": {
            "type": "string",
            "description": "Unit of measure for the data value for the
            tag point"
        },
        "alarmStatus": {
            "type": "string",
            "description": "Indicates whether there are any alarms
            currently active for the tagpoint"
        },
        "readingTime": {
            "type": "string",
            "format": "date-time",
            "description": "date time when the tag point value was
            read from the device."
```

PowerData Object:

```
"PowerData": {
  "type": "object",
  "properties": {
    "ibx": {
      "type": "string",
      "description": "ibx code"
    },
    "accountNo": {
      "type": "string",
      "description": "customer account number"
    },
    "levelType": {
      "type": "string",
      "description": "power hierarchy node levelType linked to the
      power data",
      "enum": [ "ibx", "cage", "cabinet", "circuit" ]
    },
    "levelValue": {
      "type": "string",
      "description": "power hierarchy node levelValue linked to the
      power data. ibx code, cage unique space id, cabinet unique space
      id and circuit id for levelType ibx, cage, cabinet, circuit resp."
    },
    "isAlarm": {
      "type": "string"
    },
    "kva": {
      "type": "number",
      "description": "power consumption in kva"
    },
    "amps": {
      "type": "number",
      "description": "instantaneous current amp reading on circuits"
    },
    "cage": {
      "type": "string",
      "description": "cage unique space id"
    },
    "cabinet": {
      "type": "string",
      "description": "cabinet unique space id"
    },
    "soldKva": {
      "type": "number",
      "description": "maximum amp draw allowable on a circuit"
    },
    "cabinetRating": {
      "type": "number",
      "description": "maximum kVA draw allowed for the cabinet"
    },
    "contractualKva": {
      "type": "number",
      "description": "The maximum power draw contractually
      allowable in a private cage."
    },
    "percentageKva": {
      "type": "number",
      "description": "calculated field kva / contractualKva"
    },
    "peakKvaLastSevenDays": {
      "type": "number"
    },
    "peakKvaLastSevenDaysPercentage": {
      "type": "number"
    },
    "peakKvaLastSevenDaysContractualKva": {
      "type": "number"
    },
    "peakKvaLastSevenDaysTime": {
      "type": "integer"
    },
    "type": {
      "type": "string",
      "description": "value to be IBX, CAGE, CABINET, primary or
      redundant for levelType ibx, cage, cabinet, circuit resp.",
      "enum": [ "IBX", "CAGE", "CABINET", "primary",
      "redundant" ]
    },
    "description": {
      "type": "string",
      "description": "circuit description when the levelType is circuit;
      null
      otherwise."
    },
    "soldAmps": {
      "type": "integer"
    },
    "primaryKva": {
      "type": "number",
      "description": "the sum of instantaneous power draw reading
      on all the
      primary circuits within the levelType."
    },
    "redundantKva": {
      "type": "number",
      "description": "the sum of instantaneous power draw reading
      on all the
      redundant circuits within the levelType."
    },
    "kw": {
      "type": "string",
      "description": "measure of real power expressed in kilowatt
      applicable for ibxs that have capability of energy meter reading"
    },
    "powerFactor": {
      "type": "string",
      "description": "The ratio between real power and apparent power
      in a
      circuit.(kW/kVA)"
    },
    "readingTime": {
      "type": "string",
      "description": "date-time when the latest value was read
      in (epoc -milliseconds)."
    },
    "lastUpdatedTime": {
      "type": "string",
      "description": "date-time when the latest value was
      updated (epoc -milliseconds)."
    },
    "customerName": {
      "type": "string"
    }
  }
}
```

EnvironmentData Object:

```
"EnvironmentData": {
  "type": "object",
  "properties": {
    "ibx": {
      "type": "string",
      "description": "ibx code"
    },
    "accountNo": {
      "type": "string",
      "description": "account number"
    },
    "zone": {
      "type": "string",
      "description": "zone unique space id"
    },
    "cage": {
      "type": "string",
      "description": "cage unique space id"
    },
    "cabinet": {
```

```
    "type": "string",
    "description": "cabinet unique space id"
},
"sensor": {
    "type": "string",
    "description": "sensor id"
},
"temperature": {
    "type": "string",
    "description": "current temperature"
},
"humidity": {
    "type": "string",
    "description": "current humidity"
},
"timestamp": {
    "type": "string",
    "description": "epoch timestamp when the current reading was
    read"
},
"temperatureUom": {
    "type": "string",
    "description": "unit of measure for temperature values"
},
"humidityUom": {
    "type": "string",
    "description": "unit of measure for humidity"
},
"minTemperature": {
    "type": "string",
    "description": "minimum temperature for last x(?) hours"
},
"maxTemperature": {
    "type": "string",
    "description": "maximum temperature for last x(?) hours"
},
"minHumidity": {
    "type": "string",
    "description": "minimum humidity for last x(?) hours"
},
"maxHumidity": {
    "type": "string",
    "description": "maximum humidity for last x(?) hours"
}
            }
        }
    }
}
```

Asset Resiliency is an indicator of whether the functionality of the asset is in doubt irrespective of whether the particular asset is functioning or not. Asset Resiliency is a configurable point based on underlying assets that help determine the system resiliency. For example, a data center 12 may have power generators—G-1, G-2, G-3, G-1R, G-2R, G-3R. G-1, G-2 and G-3 are capable of serving the demands for the datacenter 12 with 3 redundant generators, G-1R, G-2R, and G-3R.

Scenario 1: G-1 and G-2R are not functioning. Even though the G-1 and G-2R are not functioning, because the rest of the functioning generators are able to serve the demand for the datacenter all of the generators are considered to be resilient.

Scenario 2: If for some reason four of the generators are not functioning, then the generators are no longer considered in resilient state even though none of them may actually be in use.

Resiliency data informs customers regarding changes in asset resiliency to enable them to make operational decisions based on live machine data feeds. An example ResiliencyData object is as follows:

```
"ResiliencyData": {
    "type": "object",
    "properties": {
        "ibx": {
            "type": "string",
            "description": "ibx code"
        },
        "accountNo": {
            "type": "string",
            "description": "account number"
        },
        "classification": {
            "type": "string",
            "description": "asset classification"
        },
        "assettype": {
            "type": "string",
            "description": "asset type"
        },
        "assetids": {
            "type": "array",
            "description": "asset ids"
            "items":
                "type": "string"
        },
        "prev_status": {
            "type": "string",
            "description": "previous status"
        },
        "current_status": {
            "type": "string",
            "description": "current status"
        },
        "timestamp": {
            "type": "string",
            "description": "epoch timestamp when the current reading
            was modified"
        }
    }
}
```

To provide access to the event data, DCIM platform 1006A creates topics in one or more cloud-based publication platforms 1010A-1010N. DCIM platform 1006A may additionally or alternatively create topics in one or more internal publication platforms 1030. Cloud-based publication platforms 1010 and internal publication platforms 1030 may be referred to herein more generically as "publication platforms." Cloud-based publication platforms 1010 and internal publication platform 1030 each represents an asynchronous messaging system by which publishers create and send messages to topics. Consuming applications (or "subscribers") create subscriptions to topics in order to receive the messages sent to the topics. In this way, the computing system 1000 provides a messaging service for API consumers 1004 to receive DCIM event data in near real-time. API consumers 1004 may perform one or more actions based on the DCIM event data. Each of cloud-based publication platforms 1010 and internal publication platform 1030 represents applications executing on a computing architecture and, more particularly, executing on a public, private, or hybrid cloud computing architecture. Each computing architecture for a cloud-based publication platform 1010 and an internal publication platform 1030 includes or one or more physical computing devices comprising one or more physical processors and/or virtualized execution environments executing on one or more physical processors. Example cloud-based publication platforms 1010 include the Cloud Pub/Sub service of Google Cloud, manufactured by GOOGLE, INC.; Microsoft Service Bus of Microsoft Azure, manufactured by MICROSOFT, INC.; and Simple Queue Service of Amazon Web Services, manufactured by AMAZON, INC. Example of an internal publication platform 1030 include Apache Kafka, ActiveMQ, IBM MQ, Solace Virtual Message Router, RabbitMQ, Red Hat JBoss MAQ, Anypoint MQ, Aurea CX Messenger, and Oracle Tuxedo Message Queue.

Each cloud-based publication platform 1010 offers a publish API 1016 by which DCIM platform 1006A registers new topics 1060 and publishes messages to the topics 1060 for consuming by topic subscribers. Internal publication platform 1030 may offer a similar publish API 1016 by which DCIM 1006A registers new topics 1060 and publishes messages to the topics 1060 for consuming by topic subscribers. A topic 1060 is a named resource to which messages are sent and to which a consuming application may subscribe to receive the messages. A topic 1060 may be identified using a full or partial Uniform Resource Identifier (URI). A subscription is a named resource representing messages from a topic 1060 and for delivery to a particular subscriber. A topic 1060 can have multiple subscriptions, but a particular subscription is associated with and receives messages for a single topic. A subscription may operate according to a pull model in which the subscriber requests messages for the topic 1060, or according to a push model in which the cloud-based publication platform 1010 or internal publication platform 1030 initiates requests to the subscriber to deliver messages for the topic 1060. A subscription may be identified using a full or partial URI.

In response to receiving a registration request conforming to subscription API 1018, DCIM platform 1006A processes the registration request and sends, to selected ones of cloud-based publication platforms 1010 and internal publication platform 1030 using the corresponding publish API 1016, a topic request to request a new topic for the list of events specified in the registration request and generated by the specified data center 12. DCIM platform 1006A may publish to multiple platforms. The selected ones of cloud-based publication platform 1010 and internal publication platform 1030 create the topic in topics 1060 and return a description of the topic to the DCIM platform 1006A in response to the topic request. The description of the topic may include a subscription identifier usable for creating a subscription to the topic. The subscription identifier may be a full or partial URI, a string, an integer, etc. In some instances, the description of the topic may include subscription details. The subscription details may include data describing a subscription created by the DCIM platform 1006A on behalf of the requesting API consumer 1004, and usable by the API consumer 1004 for obtaining near real-time events describing operations of a data center 12. In some instances, the registration request may specify the cloud-based publication platform 1010 and/or internal publication platform 1030 to be selected and used by the DCIM platform 1006A for publishing event data according to the registration request. DCIM platform 1006A returns the subscription identifier in a registration response to the API consumer 1004 that issued the registration request, in response to successful registration of the topic.

DCIM platform 1006A also creates mappings from each of the event subjects indicated in the registration requested to the new topic of topics 1060, and stores the mappings to data-topic map 1040. For example, a registration request may indicate two event subjects, an alarm and a tagpoint, each having a unique event identifier. After receiving the new topic from the selected ones of cloud-based publication platform 1010 and internal publication platform 1030, DCIM platform 1006A creates a mapping for each of the event subjects to the topic and stores the two mappings to data-topic map 1040. If data-topic map 1040 includes an existing mapping for an event subject, DCIM platform 1006A may add the topic to an existing list of one or more topics for the existing mapping. Thus, each mapping or entry in data-topic map 1040 is a one-to-many association of an event subject to one or more topics for publishing events relating to the event subject. Data-topic map 1040 may further include a description of the subscribed events. Data-topic map 1040 may represent an associative data structure, such as a map, a table, a list of tuples, and a hash map. The event identifier for an event subject may operate as a lookup key to a corresponding entry in data-topic map 1040, such entry mapping the event identifier/lookup key to one or more topics 1060 for the event subject. Data-topic map 1040 may represent a hash table, with mappings stored to hash buckets and hashes of event identifiers used as the lookup key. Example hash functions include SHA-1 and MD5.

DCIM platform 1006A subsequently obtains events using near real-time data 1017 from data centers 12. DCIM platform 1006A queries data-topic map 1040 using the event identifier for each event to quickly determine whether the event subject has a corresponding one or more topics in any of cloud-based publication platforms 1010 and internal publication platform 1030. If so, DCIM platform 1006A obtains the one or more topics for the event subject and publishes the event to the topic by sending a publication message, using publish APIs 1016, that includes the event data for the event to the resource for the topic. As used herein, "resource" may refer to a resource accessible at a particular URI.

As noted above, API consumers 1004 receive subscription identifiers in registration responses from DCIM platform 1006A, the subscription identifiers being usable for subscribing to corresponding topics 1060 of cloud-based publication platforms 1010 and internal publication platform 1030. Cloud-based publication platforms 1010 and internal publication platform 1030 may provide corresponding subscribe APIs 1014 for subscribing to topics 1060 to obtain events published to the topics 1060 by DCIM platform 1006A.

API consumers 1004 request subscriptions to topics 1060 by identifying the desired topics 1060 using subscription identifiers provided by DCIM platform 1006A. Using the subscriptions, API consumers 1004 request messages that include the events published to the topics 1060 by DCIM platform 1006A. In this way, API consumers 1004 may obtain event data that describes operations and conditions of data centers 12 and that is published in near real-time by DCIM platform 1006A to provide infrastructure asset updates to API consumers 1004.

In some examples, computing system 1000 uses Server-side Events (SSE) for event publication rather than cloud-based publication platforms 1010. In such examples, an API consumer 1004 subscribes to an SSE platform to obtain real-time notifications of events. The SSE platform provides a REST API for fetching event data. When DCIM platform 1006A receives a new event, DCIM platform 1006A publishes the new event to a topic for the SSE platform and notifies the API consumer 1004 of the availability of new event. The API consumer 1004 may then use the REST API to fetch the new event.

Computing system 1000 may include backup DCIM platform 1006B in some examples for disaster recovery. DCIM platform 1006B may be similar to DCIM platform 1006A but located elsewhere for geographic redundancy. DCIM platform 1006A may replicate data-topic map 1040 to DCIM platform 1006B, which may assume and perform event publication in the event of a failure of DCIM platform 1006A.

Figure 17:
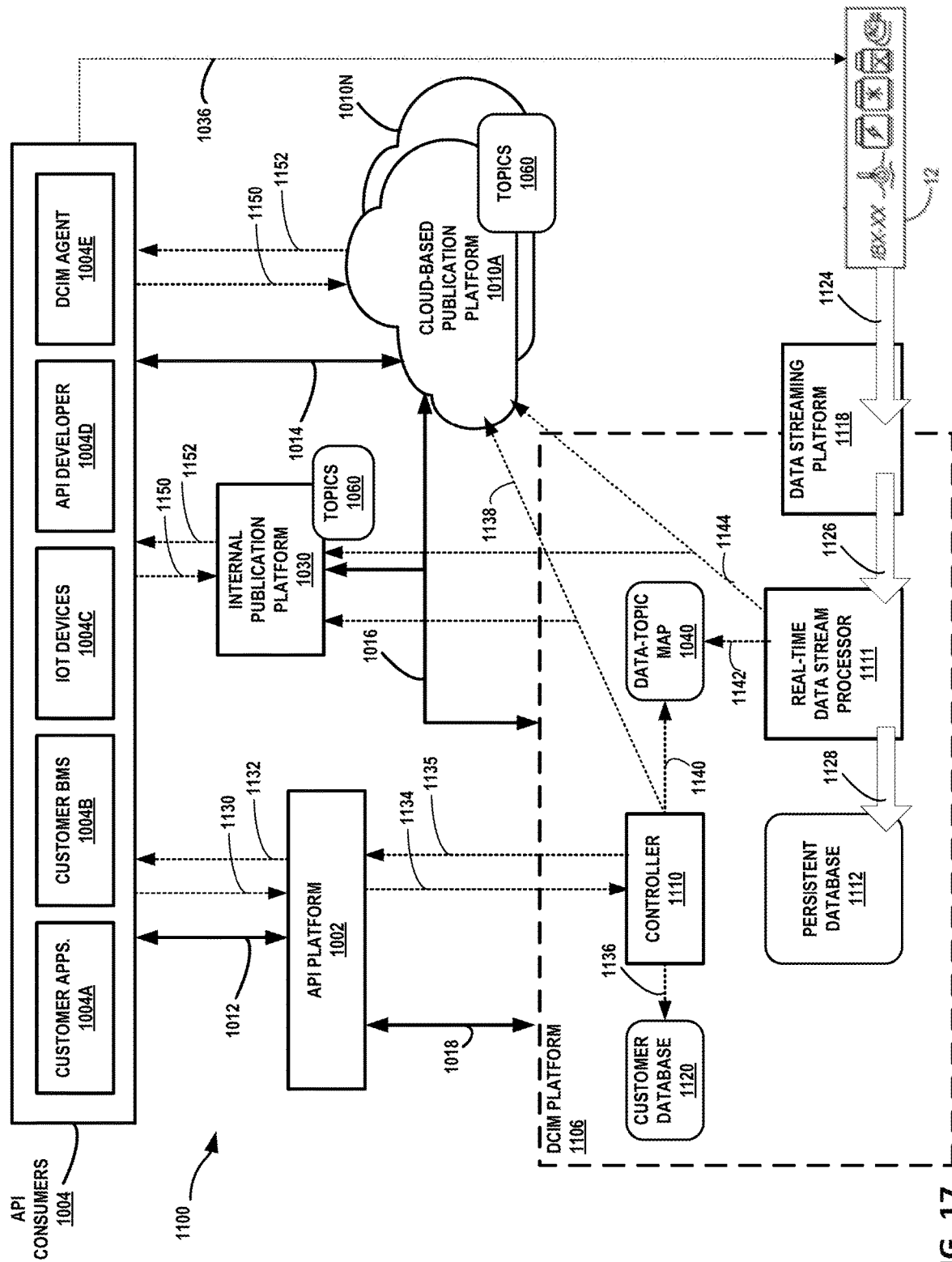
FIG. 17 is a block diagram illustrating an example system for a messaging service that applies real-time processing to data center events and publishes the processed events to custom topics of a publication platform in near real-time, according to techniques described herein.

FIG. 17 is a block diagram illustrating an example system for a messaging service that applies real-time processing to data center events and publishes the processed events to custom topics of a publication platform in near real-time, according to techniques described herein. Computing system 1100 includes an API platform 1002 and a primary data center infrastructure monitoring (DCIM) platform 1106. DCIM platform 1106 illustrates, in detail, an example implementation of primary DCIM platform 1006A.

DCIM platform 1106 includes data streaming platform 1118, real-time data stream processor 1111, and controller 1110. Each of data streaming platform 1118, real-time data stream processor 1111, and controller 1110 may represent one or more server computing devices and/or virtualized execution environments executing one or more API platform 1002 applications and/or services. Although shown as single elements, each of data streaming platform 1118, real-time data stream processor 1111, and controller 1110 may execute on a cluster of one or more physical computing devices comprising one or more physical processors and/or virtualized execution environments executing on one or more physical processors.

Data streaming platform 1118 receives real-time data 1124 generated by data center 12 and creates data streams 1126. Data streaming platform 1118 may represent an Apache Kafka instance(s), for example.

Controller 1110 processes subscription API 1018 service requests originated by API consumers 1004. Controller 1110 authorizes and processes such service requests to responsively create/modify topics 1060 and generate/modify entries of data-topic map 1040. Controller 1110 may store data-topic map 1040 to a memory of a computing device that executes one or more service instances of a controller 1110 application. In general, controller 1110 operates as a feed manager to configure real-time or near real-time feeds. Controller 1110 receives inputs from controlling applications and determines data, alarms, and alerts that should flow to API consumers 1004. As described in further detail below, operations of controller 1110 include receiving input from API consumers 1004 or control applications for data centers 12; obtaining asset map information for mapping data for assets to topics; determining data, alerts, and alarms that should flow to API consumers and updating data-topic mappings; and refreshing a real-time cache for real-time data stream processor 1111.

Real-time data stream processor 1111 obtains data streams 1126 generated by data streaming platform 1118 and publishes events from the data streams 1126 to topics 1060 cloud-based publication platforms 1110 based on mappings stored to data-topic map 1040. Real-time data stream processor 1111 may store data streams 1126 to a persistent database 1112. Persistent database 1112 may represent a Cassandra database instance, for example. Real-time data stream processor 1111 may represent an Apache Storm instance(s), for example.

In general, real-time data stream processor 1111 and data streaming platform 1118 consume data streams and, based on data-topic map 1040, publish data to API consumers 1004 on the configured topics 1060 (also referred to as "channels"). Data streaming platform 1118 may push data on a stream platform (e.g., Kafka) topic (not shown) that is of interest to one or more customers. Then real-time data stream processor 1111 may retrieve the data from the topic, refer to data-topic map 1040 to determine the customer and topic 1060 to push the data to, and publish the data to the determined topic(s) 1060.

As one example of processing events, DCIM agent 1004E obtains, from a publication platform 1010 or 1030, infrastructure asset data in published events 1152 for a topic 1060 that conform to cloud protocols for the messaging service of the platform. DCIM agent 1004E intelligent translates, using a pre-defined mapping, the infrastructure asset data to formatted infrastructure asset data that is usable with the network management or control protocols with which customer equipment in IBXes 12 communicate to receive infrastructure asset data. For example, a management protocol server of DCIM agent 1004E provides infrastructure asset data to a management protocol client of IBX-XX using a management protocol, e.g., SNMP. The management protocol client may issue a request requesting a certain asset data database value, which may be an OID in SNMP examples. The request may represent an SNMP Get. In response to the request, the management protocol server of DCIM agent 1004E issues a response 1036 that includes the value read from an asset data database managed by DCIM agent 1004E. In some cases, the management protocol server may be configured with traps (e.g., SNMP traps) to cause the management protocol server to issue responses 1036 for the trap values unrequested. Further example details of a DCIM agent are described in U.S. Provisional Patent Application 62/573,034, filed Oct. 16, 2017 and entitled "Data Center Agent for Data Center Infrastructure Monitoring Data Access and Translation," which is incorporated herein by reference in its entirety.

Figure 18:
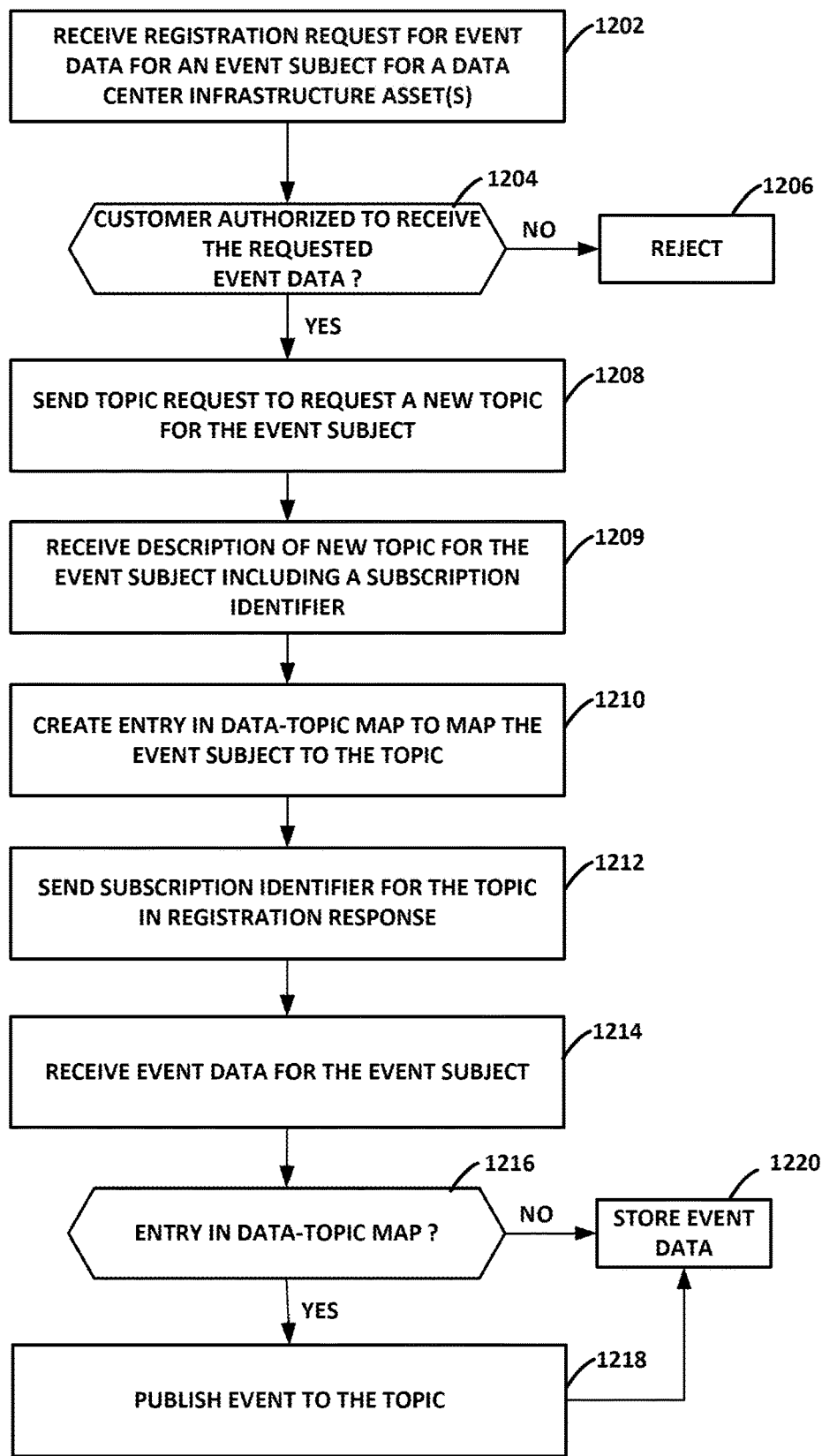
FIG. 18 is a flowchart illustrating an example mode of operation for computing system to apply real-time processing to data center events and publish the processed events to custom topics of a publication platform in near real-time, according to techniques described herein.

FIG. 18 is a flowchart illustrating an example mode of operation for computing system 1100 to apply real-time processing to data center events and publish the processed events to custom topics of a publication platform in near real-time, according to techniques described herein. Although described primarily with respect to a system that uses a cloud-based publication platform 1010 for event publication, the mode operation applies to a computing system that uses an internal publication platform 1030. API platform 1002 receives a registration request 1130 that indicates a customer of the data center 12 provider and an event subject for events that describe operations of a data center 12 and, in some cases more particularly, operations of at least one data center 12 infrastructure asset (1202). The registration request 1130 identifies a subscription API 1018 resource and conforms to subscription API 1018. API platform 1002 routes the registration request 1130 to a service instance of controller 1110 for processing. In the example of FIG. 18, controller 1110 queries customer database 1120 to determine whether the customer indicated in the registration request 1130 is authorized to access events for the event subject (1204). If not (NO branch of 1204), controller 1110 rejects the registration request and returns a registration response that indicates no success (1206). In some examples, step 1204 may be optional. The registration request may indicate the cloud-based publication platform 1010 or internal publication platform 1030 to be used for event publication.

In some examples, if a customer of the data center provider ceases to be a customer or modifies its customer footprint (e.g., amount or types or locations of resources purchased from data center provider), a security overlay manages the change in authorization to provide more (or less) authorization to data for additional (or reduced) data center resources.

If the customer is authorized (YES branch of 1204), then controller 1110 sends a topic request 1138 to cloud-based publication platform 1010A to request a new topic of topics 1060 for use for publishing DCIM events (1208). Controller 1110 receives a description of the new topic in a topic response, where the description includes a subscription identifier usable for publishing events and creating a new subscription with cloud-based publication platform 1010A (1209). In some examples, controller 1110 queries customer database 1120 to determine whether there is an existing subscriber identifier for the customer from a previous registration request. If so, the controller 1110 may reuse the existing subscriber identifier for the additional event(s) for which access is being requested in the registration request.

Controller 1110 creates an entry 1140 in the data-topic map 1040 that maps an event identifier for the event subject that is the subject of the registration request to the new topic (1210). Controller 1110 and sends a registration response 1135, responsive to registration request 1134, that includes the subscription identifier, which the API consumer 1004/customer can use to create a subscription with cloud-based publication platform 1010A for obtaining events published to the corresponding topic 1060. API platform 1102 may send a registration response 1132, responsive to registration request 1130, to the requesting API consumer 1004. Registration response 1132 may include the subscription identifier. To subscribe to a topic, API consumers may register using a subscription request 1150 that includes the subscription identifier and thereafter receive published events 1152 published by DCIM platform 1106 to the platform 1010A.

Real-time data stream processor 1111 receives event streams 1126 including event 1142 having an event identifier (1214). Real-time data stream processor 1111 uses the event identifier (or a hash or other representation thereof) as a lookup key to query data-topic map 1040 to determine whether a matching entry is stored (1216). If no matching entry is found (NO branch of 1216), real-time data stream processor 1111 stores the event data to persistent database 1112 (1220). If a matching entry is found (YES branch of 1216), real-time data stream processor 1111 publishes, with communication 1144, the event 1142 to the one or more topics mapped in the matching entry, which includes the new topic received in step 1209 (1218). Real-time data stream processor 1111 may also store the event data to persistent database 1112 (1220). The above example mode of operation may be used for publishing events to topics 1060 of internal publication platform 1030 in addition to or alternatively to a cloud-based publication platform 1010A.

FIG. 19 is a block diagram illustrating example features of a real-time partner API catalog for obtaining near real-time events from a DCIM platform 1006A that monitors one or more data centers, according to techniques described herein. Platform API is an example conceptual rendering of an API having resources for authentication (/auth), user management (/user), and user accounts (/account). FIG. 19 also depicts resources for subscription/registration provided by subscription API 1018, as well as real-time events for which the customer may register using subscription API. The near real-time API techniques described herein may enable customers to consume real-time machine data feeds, alerts, and alarms in near real-time, wherein the real-time API is defined in the form of events and objects.

Figure 20:
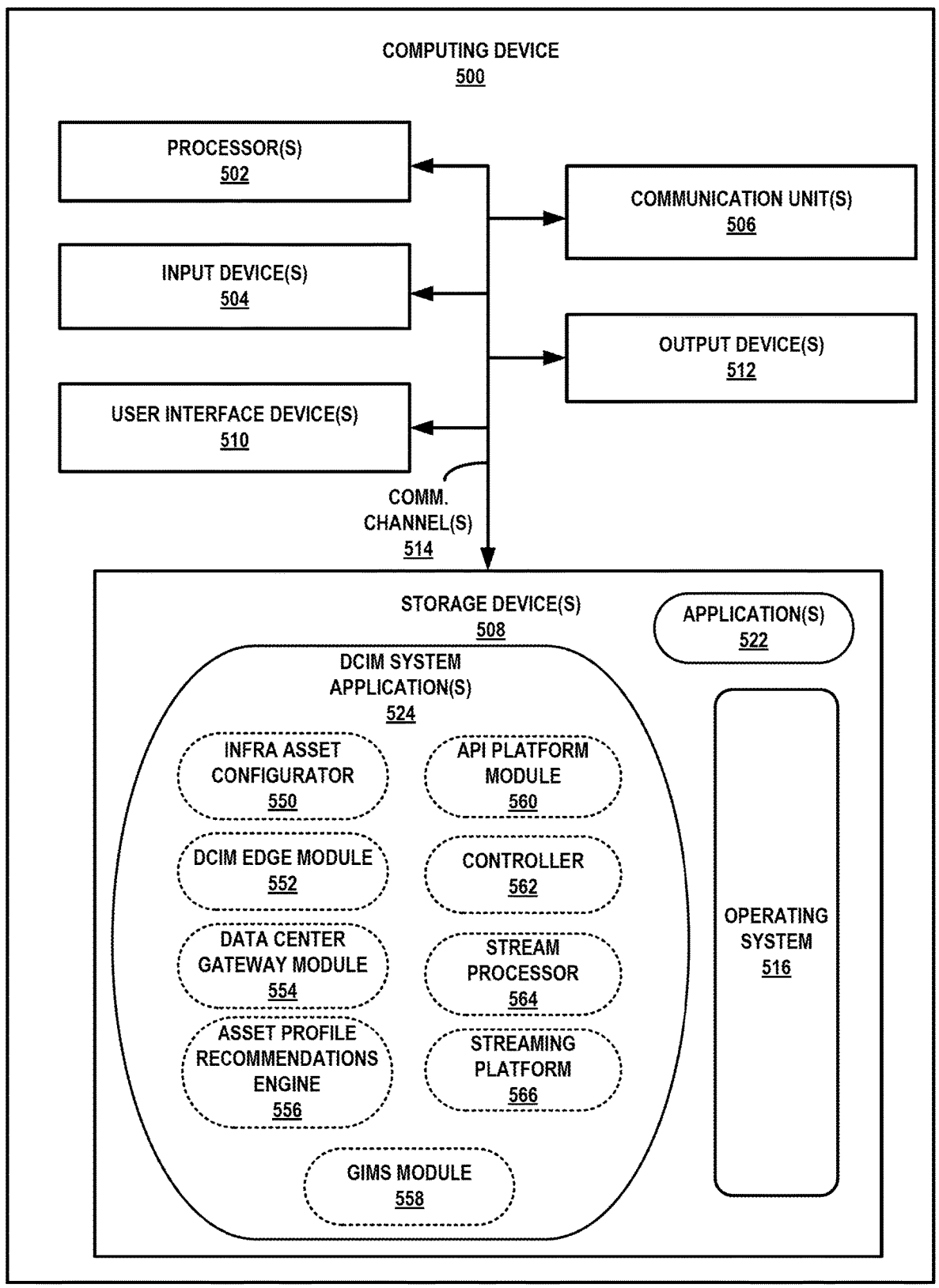
FIG. 20 is a block diagram illustrating further details of one example of a computing device that operates in accordance with one or more techniques of the present disclosure.

FIG. 20 is a block diagram illustrating further details of one example of a computing device that operates in accordance with one or more techniques of the present disclosure. FIG. 20 may illustrate a particular example of a server or other computing device 500 that includes one or more processor(s) 502 for executing any one or more of infra asset configurator 550, DCIM edge module 552, data center gateway module 554, asset profile recommendations engine 556, GIMS module 558, API platform module 560, controller 562, stream processor 564, streaming platform 566, or any other application described herein. Other examples of computing device 500 may be used in other instances. Computing device 500 may be, for example, any of DCIM systems 22 (FIG. 1), DCIM system 23 (FIG. 2), DCIM system 400 (FIG. 3), API platform 1002, and components of DCIM platform 1106. Although shown in FIG. 20 as a stand-alone computing device 500 for purposes of example, a computing device may be any component or system that includes one or more processors or other suitable computing environment for executing software instructions and, for example, need not necessarily include one or more elements shown in FIG. 20 (e.g., communication units 506; and in some examples components such as storage device(s) 508 may not be colocated or in the same chassis as other components).

As shown in the example of FIG. 20 computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, DCIM system application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and DCIM system application(s) 524 with processors 502, communication unit 506, storage device 508, input device 504, user interface devices 510, and output device 512.

Application 522 and DCIM system application(s) 524 may also include program instructions and/or data that are executable by computing device 500. Example DCIM system application(s) 524 executable by computing device 500 may include any one or more of infra asset configurator 550, DCIM edge module 552, data center gateway module 554, asset profile recommendations engine 556, GIMS module 558, API platform module 560, controller 562, stream processor 564, and streaming platform 566, each illustrated with dashed lines to indicate that these may or may not be configured for execution by any given example of computing device 500. Other DCIM system applications not shown may alternatively or additionally be included, providing other functionality described herein.

In this example, DCIM system applications 524 include infra asset configurator 550, DCIM edge module 552, data center gateway module 554, asset profile recommendations engine 556, GIMS module 558, API platform module 560, controller 562, stream processor 564, and streaming platform 566. Infra asset configurator 550 may include instructions for causing computing device 500 to perform one or more of the operations and actions described in the present disclosure with respect to infra asset configurator 44. DCIM edge module 552 may include instructions for causing computing device 500 to perform one or more of the operations and actions described in the present disclosure with respect to DCIM edge 16. Data center gateway module 554 may include instructions for causing computing device 500 to perform one or more of the operations and actions described in the present disclosure with respect to any of data center gateways 34, 110, 140. Asset profile recommendations engine 556 may include instructions for causing computing device 500 to perform one or more of the operations and actions described in the present disclosure with respect to asset profile recommendations. For example, when an asset such as a UPS, for example, is introduced into the DCIM system, the asset profile recommendations engine 556 may automatically identify an asset type based on tag points, and recommend a configuration setup based on how other assets of the same type in other data centers are configured, resulting in the introduced asset being more operationally efficient based on the setup of similar assets in the other data centers. GIMS module 558 may include instructions for causing computing device 500 to perform one or more of the operations and actions described in the present disclosure with respect to GIMS 42.

API platform module 560, controller 562, stream processor 564, and streaming platform 566 represent applications executed by computing device 500 to perform operations described with respect to computing system 1000 of FIG. 16 and computing system 1100 of FIG. 17. More specifically, API platform module 560 may exchange data with communication unit(s) 506 and perform operations described with respect to API platform 1002. Controller 562 may exchange data with communication unit(s) 506 and perform operations described with respect to controller 1110. Stream processor 564 may exchange data with communication unit(s) 506 and perform operations described with respect to real-time data stream processor 1111. Streaming platform 566 may exchange data with communication unit(s) 506 and perform operations described with respect to data streaming platform 1118.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
receiving, by a data center infrastructure monitoring system, a registration request that indicates a method of a subscription application programming interface and specifies one or more event subjects of events describing a system operation of a data center;
storing, by the data center infrastructure monitoring system to a data-topic map, respective mappings for the one or more event subjects to a topic of a cloud-based publication platform;
monitoring, by a data center infrastructure monitoring system, a plurality of physical infrastructure assets that enable system operation within the data center to obtain, for one of the plurality of physical infrastructure assets, an event that describes one of the event subjects, wherein the one of the plurality of physical infrastructure assets comprises one of a temperature sensor, a heating ventilation and air conditioning unit, a computer room air conditioning unit, an uninterruptible power supply, a generator, a power distribution unit, an air handling unit, a chiller unit, or a power unit; and
publishing, by the data center infrastructure monitoring system, the event to the topic.

2. The method of claim 1, further comprising:
determining, by the data center infrastructure monitoring system, the event describes one of the event subjects; and
mapping, by the data center infrastructure monitoring system, the one of the event subjects to the topic based on the mappings, wherein the publishing comprises:
publishing the event to the topic in response to the mapping.

3. The method of claim 1, further comprising:
sending, by the data center infrastructure monitoring system in response to receiving the registration request, a request for a new topic to the cloud-based publication platform; and
receiving, by the data center infrastructure monitoring system from the cloud-based publication platform, a subscription identifier usable for creating a subscription to the topic.

4. The method of claim 3, wherein the registration request indicates an application programming interface consumer, the method further comprising:
sending, by the data center infrastructure monitoring system in response to the registration request, the subscription identifier to the application programming interface consumer.

5. The method of claim 1, wherein the registration request indicates an application programming interface consumer, the method further comprising:
authorizing, by the data center infrastructure monitoring system, the application programming interface consumer to receive events for the one or more event subjects,
wherein the publishing comprises publishing the real-time event to the topic only if the application programming interface consumer is authorized to receive events for the one or more event subjects.

6. The method of claim 1, wherein one of the event subjects comprises one of an alarm object, an alert object, a tagpoint of an infrastructure asset, an infrastructure asset that requires electrical power, and an environmental sensor.

7. The method of claim 1, wherein the event is one of an alarm active notification, an alarm cleared notification, an alert active notification, an alert acknowledgement, a new tagpoint data value for a tagpoint of an infrastructure asset, a new power consumption datapoint, a new environmental sensor datapoint, and new resiliency information.

8. The method of claim 1, wherein the registration request specifies each event subject of the one or more event subjects using an event identifier that uniquely identifies the event subject.

9. The method of claim 8, wherein the respective mappings for the one or more event subjects to the topic comprise respective mappings that map the respective event identifiers for the event subject to the topic.

10. The method of claim 8, wherein the data-topic map comprises a hash map and wherein the respective mappings for the one or more event subjects to the topic comprise respective mappings that map respective hashes of respective event identifiers for the event subject to the topic.

11. The method of claim 1, further comprising:
generating, by a data streaming platform of the data center infrastructure monitoring system, the event that describes one of the event subjects from real-time data produced by one of the physical infrastructure assets.

12. The method of claim 11, further comprising:
receiving, by a real-time stream processor of the data center infrastructure monitoring system, the event from the data streaming platform,
wherein the publishing comprises publishing, by the real-time stream processor, the event to the topic in near real-time.

13. The method of claim 11,
wherein the cloud-based publication platform comprises one of a publication-subscription platform and a server-side event platform, and
wherein the topic comprises a named resource to which messages can be sent and to which a consuming application may register or subscribe to receive the messages.

14. The method of claim 13, wherein the publishing comprises sending, by the data center infrastructure monitoring system to the cloud-based publication platform, a message that indicates the topic and includes event data for the event.

15. The method of claim 1, further comprising:
detecting, by an edge system, a presence of a physical infrastructure asset of the one or more physical infrastructure assets;

selecting, by the edge system, a communication protocol for receiving data associated with the detected physical infrastructure asset;

receiving, by the edge system, the data using the selected communication protocol; and sending, by the edge system, the data to the data center infrastructure monitoring system.

16. A non-transitory computer-readable storage medium comprising instructions that when executed cause one or more processors of a data center infrastructure monitoring system to:

receive a registration request that indicates a method of a subscription application programming interface and specifies one or more event subjects of events describing a system operation of a data center;

store, to a data-topic map, respective mappings for the one or more event subjects to a topic of a cloud-based publication platform;

monitor a plurality of physical infrastructure assets that enable system operation within the data center to obtain, for one of the plurality of physical infrastructure assets, an event that describes one of the event subjects, wherein the one of the plurality of physical infrastructure assets comprises one of a temperature sensor, a heating ventilation and air conditioning unit, a computer room air conditioning unit, an uninterruptible power supply, a generator, a power distribution unit, an air handling unit, a chiller unit, or a power unit; and publish the event to the topic.

17. A computing system, the computing system comprising one or more processors and memory, the one or more processors and memory configured for:

receiving a registration request that indicates a method of a subscription application programming interface and specifies one or more event subjects of events describing a system operation of a data center;

storing, to a data-topic map, respective mappings for the one or more event subjects to a topic of a cloud-based publication platform;

monitoring a plurality of physical infrastructure assets that enable system operation within the data center to obtain, for one of the plurality of physical infrastructure assets, an event that describes one of the event subjects, wherein the one of the plurality of physical infrastructure assets comprises one of a temperature sensor, a heating ventilation and air conditioning unit, a computer room air conditioning unit, an uninterruptible power supply, a generator, a power distribution unit, an air handling unit, a chiller unit, or a power unit; and publishing the event to the topic.

* * * * *